US012630655B2

(12) United States Patent
Chen et al.

(10) Patent No.: US 12,630,655 B2
(45) Date of Patent: May 19, 2026

(54) ZIEGLER-NATTA (PRO)CATALYST SYSTEMS MADE WITH (MULTI-ALKOXY)SILANE COMPOUND

(71) Applicant: Dow Global Technologies LLC, Midland, MI (US)

(72) Inventors: Linfeng Chen, Missouri City, TX (US); Jesse C. Beilhart, South Charleston, WV (US); David T. Gillespie, Pearland, TX (US); Mridula Kapur, Lake Jackson, TX (US); Ian M. Munro, Lake Jackson, TX (US); Eduardo Garcia, Katy, TX (US); Nori Williams, Pearland, TX (US); Evelyn Auyeung, Houston, TX (US); Kurt F. Hirsekorn, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 610 days.

(21) Appl. No.: 17/995,862

(22) PCT Filed: Apr. 22, 2021

(86) PCT No.: PCT/US2021/028595

§ 371 (c)(1),
(2) Date: Oct. 10, 2022

(87) PCT Pub. No.: WO2021/221988

PCT Pub. Date: Nov. 4, 2021

(65) Prior Publication Data

US 2023/0151124 A1 May 18, 2023

Related U.S. Application Data

(60) Provisional application No. 63/017,857, filed on Apr. 30, 2020.

(51) Int. Cl.

| | |
|---|---|
| ***C08F 4/646*** | (2006.01) |
| ***C08F 4/651*** | (2006.01) |
| ***C08F 10/02*** | (2006.01) |
| ***C08F 110/00*** | (2006.01) |
| ***C08F 110/02*** | (2006.01) |
| ***C08F 210/00*** | (2006.01) |
| ***C08F 210/14*** | (2006.01) |
| ***C08F 210/16*** | (2006.01) |

(52) U.S. Cl.

CPC ............ *C08F 4/6465* (2013.01); *C08F 4/651* (2013.01); *C08F 110/00* (2013.01); *C08F 210/00* (2013.01)

(58) Field of Classification Search

CPC ...... C08F 4/6465; C08F 4/651; C08F 110/00; C08F 210/00

See application file for complete search history.

(56) References Cited

U.S. PATENT DOCUMENTS

| | | | | |
|---|---|---|---|---|
| 4,242,479 | A | 12/1980 | Yokota et al. | |
| 4,396,534 | A | 8/1983 | Matsuura et al. | |
| 4,522,930 | A | 6/1985 | Albizzati et al. | |
| 4,927,797 | A | 5/1990 | Ewen | |
| 5,336,652 | A | 8/1994 | Mink et al. | |
| 5,869,418 | A | 2/1999 | Iskola et al. | |
| 6,958,378 | B2 | 10/2005 | Yang et al. | |
| 7,196,152 | B2 | 3/2007 | Alt et al. | |
| 7,371,806 | B2 | 5/2008 | Ferraro et al. | |
| 9,688,795 | B2 | 6/2017 | Cerk et al. | |
| 9,988,475 | B2 | 6/2018 | Chen et al. | |
| 10,113,018 | B2 | 10/2018 | Gupta et al. | |
| 2018/0030179 | A1* | 2/2018 | Sumerin | C08L 23/16 |
| 2018/0237552 | A1* | 8/2018 | Fang | C08F 110/06 |
| 2019/0002610 | A1 | 1/2019 | Toltsch et al. | |

FOREIGN PATENT DOCUMENTS

| | | | |
|---|---|---|---|
| CA | 2510679 | C | 4/2013 |
| CN | 101671408 | A | 3/2010 |
| CN | 103304869 | B | 5/2015 |
| CN | 108586640 | A | 9/2018 |
| EP | 0731114 | A1 | 9/1996 |
| JP | 2002249509 | A | 9/2002 |
| JP | 2003212918 | A | 7/2003 |
| WO | 2002038624 | A1 | 5/2002 |
| WO | 2005058982 | | 6/2005 |
| WO | 2009027270 | A1 | 3/2009 |
| WO | 2009148487 | A1 | 12/2009 |
| WO | 2014004396 | A1 | 1/2014 |
| WO | 2014102813 | A1 | 7/2014 |
| WO | 2016124676 | | 8/2016 |
| WO | 2017040127 | A1 | 3/2017 |
| WO | 2019241044 | A1 | 12/2019 |

OTHER PUBLICATIONS

Niemeyer et al., Dalton Trans., (2009), p. 3731-3741.*

Office Action from corresponding Chinese Application No. 202180030825 dated Feb. 2, 2024.

IUPAC, Compendium of Chemical Terminology, Gold Book, 2014, vol. 2.3.3.

Salakhov, "Polypropylene synthesis in liquid monomer with titanium-magnesium catalyst: effect of different alkoxysilanes as external donors" 2019, p. 1-11.

Striegel, "Modern Size-Exclusion Liquid Chromatography Practice of Gel Permeation and Gel Filtration Chromatography" 2009, p. 242, 263.

(Continued)

*Primary Examiner* — Yong L Chu

(57) ABSTRACT

Ziegler-Natta (pro)catalyst systems made with an external electron donor compound, methods of synthesis of same, methods of olefin polymerization using same, and polyolefin polymers made thereby. The external electron donor compound is a (multi-alkoxy)silane.

8 Claims, No Drawings

(56) References Cited

OTHER PUBLICATIONS

Williams, "The Construction of a Polyethylene Calibration Curve for Gel Permeation Chromatography using Polystyrene Fractions," 1968, vol. 6, p. 621-624.
PCT/US2021/028595, Internatinal Search Report and Written Opinion with a mailing date of Sep. 10, 2021.
PCT/US2021/028595, International Preliminary Report on Patentability with a mailing date of Oct. 27, 2022.

* cited by examiner

ZIEGLER-NATTA (PRO)CATALYST SYSTEMS MADE WITH (MULTI-ALKOXY)SILANE COMPOUND

FIELD

Ziegler-Natta (pro)catalyst systems made with an external electron donor compound, methods of synthesis of same, methods of olefin polymerization using same, and polyolefin polymers made thereby.

INTRODUCTION

Patent application publications and patents in or about the field include U.S. Pat. Nos. 4,242,479; 4,522,930; 4,927,797; 5,869,418; 7,196,152B2; U.S. Pat. No. 7,371,806B2; U.S. Ser. No. 10/113,018B2; CA2510679C; CN103304869B; CN108586640A; EP0731114A1; EP1017493A1; US20180030179A1; WO2002038624A1; WO2005058982; WO2009027270A1; WO2009148487A1; and WO2014102813A1. See also lidar Salakhov et al., Polypropylene synthesis in liquid monomer with titanium-magnesium catalyst: effect of different (multi-alkoxy)silanes as external donors, Journal of Polymer Research, June 2019, 26(6). DOI: 10.1007/s10965-019-1794-5.

SUMMARY

We discovered an external electron donor-modified Ziegler-Natta procatalyst system, an external electron donor compound-modified Ziegler-Natta catalyst system made therefrom, methods of making same, methods of polymerizing olefin monomers using the catalyst system, and polyolefin polymers made thereby.

DETAILED DESCRIPTION

An external electron donor-modified Ziegler-Natta procatalyst system, an external electron donor compound-modified Ziegler-Natta catalyst system made therefrom, methods of making same, methods of polymerizing olefin monomers using the catalyst system, and polyolefin polymers made thereby.

A procatalyst system consisting essentially of a blend of a pre-made solid procatalyst and a (multi-alkoxy)silane. The procatalyst system is a Ziegler-Natta-type procatalyst system that is suitable for making a Ziegler-Natta-type olefin polymerization catalyst, which is made by contacting the procatalyst system with an activator. Based upon how the (multi-alkoxy)silane is used and how it is formulated with the pre-made solid procatalyst in the procatalyst system, the (multi-alkoxy)silane functions as the external electron donor compound (EEDC) in the procatalyst system. The pre-made solid procatalyst consists essentially of a titanium compound, magnesium chloride solids, and optionally a silica. The magnesium chloride solids consist essentially of $MgCl_2$ and at least one of a cyclic ($C_2$-$C_6$)ether, a ($C_1$-$C_6$)alcohol, or a hydroxyl-substituted cyclic ($C_3$-$C_7$)ether. The procatalyst system is free of any other electron donor organic compound. The procatalyst system, when activated with the activator, makes the catalyst system.

The method of polymerization may comprise a gas-phase polymerization run under gas-phase polymerization conditions in a gas-phase polymerization reactor, a slurry-phase polymerization run under slurry-phase polymerization conditions in a slurry-phase polymerization reactor, a solution-phase polymerization run under solution-phase polymerization conditions in a solution-phase polymerization reactor, or a combination of any two thereof. For example, the combination may comprise two sequential gas-phase polymerizations, or the combination may comprise a slurry-phase polymerization followed by a gas-phase polymerization.

The polyolefin polymer made by the polymerization method has at least one improved property relative to a polyolefin polymer made by a comparative Ziegler-Natta catalyst system that lacks the (multi-alkoxy)silane as an external electron donor.

Additional inventive aspects follow; some are numbered for easy cross-referencing.

Aspect 1. A procatalyst system suitable for making an olefin polymerization catalyst and consisting essentially of a blend of (A) a pre-made solid procatalyst and (B) a (multi-alkoxy)silane; wherein the (A) pre-made solid procatalyst consists essentially of a titanium compound, magnesium chloride solids, and optionally a silica; wherein the magnesium chloride solids consist essentially of $MgCl_2$ and at least one oxaheterocycle; and wherein the procatalyst system is free of any other electron donor organic compound. Based upon how the (B) (multi-alkoxy)silane is used and how it is formulated with the (A) pre-made solid procatalyst in the procatalyst system, the (B) (multi-alkoxy)silane functions as the external electron donor compound (EEDC) in the procatalyst system. The titanium compound is supported by or on the magnesium chloride solids and, if any silica is present, by or on the silica.

Aspect 2. The procatalyst system of aspect 1 wherein the (B) (multi-alkoxy)silane is an aromatic (multi-alkoxy)silane of formula (I): $R^1_mH_nSi(OR^2)_{4-m-n}$ (1); wherein subscript m is 0 and subscript n is 0, 1, or 2 or wherein subscript m is 1 and subscript n is 0 or 1 or wherein subscript m is 2 and subscript n is 0; wherein $R^1$ is an unsubstituted ($C_1$-$C_{20}$) alkyl group, an unsubstituted ($C_3$-$C_{12}$)cycloalkyl group, a ($C_1$-$C_{10}$)alkyl-substituted ($C_3$-$C_{12}$)cycloalkyl group, a ($C_3$-$C_{10}$)cycloalkyl-substituted ($C_1$-$C_{10}$)alkyl group, an unsubstituted ($C_6$-$C_{12}$)aryl group, a ($C_1$-$C_{10}$)alkyl-substituted ($C_6$-$C_{10}$)aryl group, or an unsubstituted ($C_7$-$C_{20}$)aralkyl group; and wherein $R^2$ is an unsubstituted ($C_1$-$C_{20}$)alkyl group, an unsubstituted ($C_3$-$C_{12}$)cycloalkyl group, a ($C_1$-$C_{10}$)alkyl-substituted ($C_3$-$C_{12}$)cycloalkyl group, a ($C_3$-$C_{10}$)cycloalkyl-substituted ($C_1$-$C_{10}$)alkyl group, or an unsubstituted ($C_7$-$C_{20}$)aralkyl group.

Aspect 3. The procatalyst system of any one of aspects 1 to 2 wherein the (B) (multi-alkoxy)silane is an aromatic (multi-alkoxy)silane of formula (Ia): $R^1_mSi(OR^2)_{4-m-n}$ (Ia); wherein subscript m is 0, 1, or 2; wherein $R^1$ is an unsubstituted ($C_1$-$C_{20}$)alkyl group, an unsubstituted ($C_3$-$C_{12}$)cycloalkyl group, a ($C_1$-$C_{10}$)alkyl-substituted ($C_3$-$C_{12}$)cycloalkyl group, a ($C_3$-$C_{10}$)cycloalkyl-substituted ($C_1$-$C_{10}$)alkyl group, an unsubstituted ($C_6$-$C_{12}$)aryl group, a ($C_1$-$C_{10}$)alkyl-substituted ($C_6$-$C_{10}$)aryl group, or an unsubstituted ($C_7$-$C_{20}$) aralkyl group; and wherein $R^2$ is an unsubstituted ($C_1$-$C_{20}$) alkyl group, an unsubstituted ($C_3$-$C_{12}$)cycloalkyl group, a ($C_1$-$C_{10}$)alkyl-substituted ($C_3$-$C_{12}$)cycloalkyl group, a ($C_3$-$C_{10}$)cycloalkyl-substituted ($C_1$-$C_{10}$)alkyl group, or an unsubstituted ($C_7$-$C_{20}$)aralkyl group.

Aspect 4. The procatalyst system of any one of aspects 1 to 3 wherein the magnesium chloride solids consist essentially of $MgCl_2$ and an oxaheterocycle selected from the group consisting of an unsubstituted cyclic ($C_2$-$C_6$)ether; furan; dihydrofuran; pyran; dihydropyran; tetrahydropyran; 1,4-dioxane; a difuranyl-($C_1$-$C_6$)alkylene; a bis(tetrahydrofuranyl)-($C_1$-$C_6$)alkylene; and a ($C_1$-$C_3$)alkyl-substituted derivative of any one thereof.

Aspect 5. The procatalyst system of any one of aspects 1 to 3 wherein the magnesium chloride, solids consist essentially of $MgCl_2$ and an oxaheterocycle selected from tetrahydrofuran.

Aspect 6. The procatalyst system of any one of aspects 1 to 5 wherein the titanium compound is at least one compound of formula (III): $TiX_4$ (III), wherein each X independently is Cl, Br, I, or a $(C_1\text{-}C_{12})$alkoxy, alternatively a $(C_1\text{-}C_6)$alkoxy. In some aspects each X is Cl; alternatively each X is a $(C_1\text{-}C_6)$alkoxy, alternatively a $(C_4\text{-}C_6)$alkoxy.

Aspect 7. The procatalyst system of any one of aspects 1 to 6 further consisting essentially of a ligand-metal complex of formula (IV): $MX_4$ (IV), wherein M is Hf or Zr and each X independently is Cl, Br, I, or a $(C_1\text{-}C_6)$alkoxy.

Aspect 8. A method of synthesizing a procatalyst system, the method comprising drying a mixture consisting essentially of a solution and, optionally, a silica, and being free of (B) a (multi-alkoxy)silane and any other electron donor organic compound, wherein the solution consists essentially of a titanium compound, magnesium chloride, and the at least one oxaheterocycle mixed in a hydrocarbon solvent; thereby removing the hydrocarbon solvent from the mixture and crystallizing the magnesium chloride so as to give (A) a pre-made solid procatalyst; and contacting the (A) pre-made solid procatalyst with the (B) (multi-alkoxy)silane; thereby making the blend of the procatalyst system of any one of aspects 1 to 7.

Aspect 9. A method of making a catalyst system suitable for polymerizing an olefin, the method comprising contacting the procatalyst system of any one of aspects 1 to 7, or the procatalyst system made by the method of aspect 8, with an activating effective amount of (C) an activator, thereby making the catalyst system; wherein the catalyst system is free of the any other electron donor organic compound and is suitable for polymerizing an olefin.

Aspect 10. A method of making a catalyst system suitable for polymerizing an olefin, the method comprising simultaneously or sequentially contacting an activating effective amount of (C) an activator, (B) a (multi-alkoxy)silane, and (A) a pre-made solid procatalyst, thereby making the catalyst system; wherein the (A) pre-made solid procatalyst consists essentially of a titanium compound, magnesium chloride solids, and optionally a silica; wherein the magnesium chloride solids consist essentially of $MgCl_2$ and the at least one oxaheterocycle; and wherein the catalyst system is free of the any other electron donor organic compound and is suitable for polymerizing an olefin.

Aspect 11. A catalyst system made by the method of aspect 9 or 10. The catalyst system is believed to have functionally-modified or attenuated active sites.

Aspect 12. A method of synthesizing a polyolefin polymer, the method comprising contacting at least one olefin monomer with the catalyst system of aspect 11 under effective polymerization conditions in a polymerization reactor, thereby making the polyolefin polymer. In some embodiments the polyolefin polymer is a poly(ethylene-co-1-alkene) copolymer, alternatively a poly(ethylene-co-$(C_4\text{-}C_8)$1-alkene) copolymer, alternatively a poly(ethylene-co-1-hexene) copolymer.

Aspect 13. The embodiment of any one of aspects 2 to 12 wherein subscript m is 0, 1, or 2 and subscript n is 0. In some aspects, subscript m is 0 and subscript n is 0; alternatively subscript m is 1 and subscript n is 0; alternatively subscript m is 2 and subscript n is 0.

Aspect 14. The embodiment of any one of aspects 2 and 4 to 12 wherein the (B) (multi-alkoxy)silane is a compound of formula (I) wherein subscript m is 0 and subscript n is 1; alternatively subscript m is 0 and subscript n is 2; alternatively subscript m is 1 and subscript n is 1. In some aspects, subscript m is 0 and subscript n is 1 or 2; alternatively subscript m is 1 and subscript n is 1. When subscript n is 1 or 2, the compound of formula (I) is a silicon-hydride (Si—H) functional (multi-alkoxy)silane. Without being bound by theory, it is believed that Si—H functional groups can react with hydroxyl groups under catalyzed and non-catalyzed conditions via a dehydrogenative mechanism. The hydroxyl groups may be present in the silica gel, if any, or generated in situ by partial hydrolysis by ambient moisture of the (B) (multi-alkoxy)silane.

Aspect 15. The embodiment of any one of aspects 2 to 14 wherein the (B) (multi-alkoxy)silane is aromatic such that at least one $R^1$ is an unsubstituted $(C_6\text{-}C_{12})$aryl group, a $(C_1\text{-}C_{10})$alkyl-substituted $(C_6\text{-}C_{10})$aryl group, or an unsubstituted $(C_7\text{-}C_{20})$aralkyl group and/or at least one $R^2$ is an unsubstituted $(C_7\text{-}C_{20})$aralkyl group.

Aspect 16. The embodiment of any one of aspects 2 to 14 wherein the (B) (multi-alkoxy)silane is saturated such that $R^1$ is not an unsubstituted $(C_6\text{-}C_{12})$aryl group, a $(C_1\text{-}C_{10})$alkyl-substituted $(C_6\text{-}C_{10})$aryl group, or an unsubstituted $(C_7\text{-}C_{20})$aralkyl group; and $R^2$ is not an unsubstituted $(C_7\text{-}C_{20})$aralkyl group.

Aspect 17. The embodiment of any one of aspects 1 to 14 wherein the (B) (multi-alkoxy)silane is a tetraalkoxysilane (e.g., tetraethoxysilane), a trialkoxysilane (e.g., trimethoxysilane), an alkyltrialkoxysilane (e.g., propyltrimethoxysilane), or a dialkyldialkoxysilane (e.g. dicyclopentyldimethoxysilane).

Aspect 18. The embodiment of any one of aspects 1 to 14 wherein the (B) (multi-alkoxy)silane is selected from the group consisting of: tetraethoxysilane; propyltrimethoxysilane; dicyclopentyldimethoxysilane; and methyl, cyclohexyldimethoxysilane.

Aspect 19. The embodiment of any one of aspects 1 to 18 wherein the oxaheterocycle is selected from the group consisting of: furan; dihydrofuran; pyran; dihydropyran; tetrahydropyran; 1,4-dioxane; 2,2-difuranyl-propane; 2,2-bis(tetrahydrofuranyl)-propane; and tetrahydro-methylfuran. In some embodiments the oxaheterocycle is furan or 2,2-difuranyl-propane. In some embodiments the oxaheterocycle is dihydrofuran or dihydropyran. In some embodiments the oxaheterocycle is pyran. In some embodiments the oxaheterocycle is tetrahydropyran or 2,2-bis(tetrahydrofuranyl)-propane. In some embodiments the oxaheterocycle is 1,4-dioxane. In some embodiments the oxaheterocycle is tetrahydrofuran or tetrahydro-methylfuran.

Aspect 20. A method of making a second catalyst system, the method comprising drying a mixture of a solution of a titanium compound, magnesium chloride, and the at least one oxaheterocycle mixed in a hydrocarbon solvent, and the solution being free of the (B) (multi-alkoxy)silane and the any other electron donor compound, thereby removing the hydrocarbon solvent from the mixture and crystallizing the magnesium chloride so as to give the (A) pre-made solid procatalyst; and contacting the (A) pre-made solid procatalyst with an activating effective amount of (C) an activator, thereby making a first catalyst system; and contacting the first catalyst system with the (B) (multi-alkoxy)silane, thereby making the second catalyst system; wherein the catalyst system is free of the any other electron donor compound.

Aspect 21. The embodiment of any one of aspects 1 to 20 wherein the any other electron donor compound is a heterorganic compound consisting of C atoms, H atoms, at least one heteroatom selected from N, P, S, O other than the oxaheterocycle and (B) (multi-alkoxy)silane; and Si atom other than the (B) (multi-alkoxy)silane.

Aspect 22. A method of synthesizing a polyolefin polymer, the method comprising contacting at least one olefin monomer with the catalyst system of any one of aspects 20 to 21 under effective polymerization conditions in a polymerization reactor, thereby making the polyolefin polymer.

Aspect 23. A polyolefin polymer made by the method of aspect 12 or 22.

The procatalyst system. The procatalyst system is a new type of Ziegler-Natta procatalyst system. The procatalyst system consists essentially of the blend of the (A) pre-made solid procatalyst and the (B) (multi-alkoxy)silane. In this context, the "consists essentially of" (and equivalents thereof such as "consisting essentially of") means that the procatalyst system is free of a silicon atom-containing organic compound that is not the (B) (multi-alkoxy)silane and free of an oxygen-containing organic compound that is not the oxaheterocycle. The procatalyst system may be also free of an activator, which otherwise would react with the (A) pre-made solid procatalyst and make the catalyst system. Additionally, the procatalyst system, and the catalyst system made therefrom, may be free of a nitrogen atom-containing compound that is an azaheterocycle.

The blend. The blend of the (A) pre-made solid procatalyst and the (B) (multi-alkoxy)silane means a physical admixture of constituents (A) and (B). Like the procatalyst system, the blend is free of a silicon atom-containing organic compound that is not the (B) (multi-alkoxy)silane and free of an oxygen-containing organic compound that is not the oxaheterocycle. The blend may be also free of an activator, which otherwise would react with the (A) pre-made solid procatalyst and make the catalyst system. Additionally, the blend may be free of a nitrogen atom-containing compound that is an azaheterocycle. The blend intrinsically is made by making constituent (A) in the absence of constituent (B), and then physically intermixing (A) and (B) together to give the blend. Thus, the blend may be called a "post-preparation blend" because the blend is made after constituent (A) is prepared or made.

The blend of constituents (A) and (B) is distinct compositionally and functionally from a comparative in situ blend made by mixing the titanium compound, a solution of magnesium chloride and oxaheterocycle dissolved in a hydrocarbon solvent, and optionally the silica, in the presence of (B), and then solidifying the magnesium chloride. This is at least in part because the resulting comparative magnesium chloride solids made by the in situ blending would inherently contain trapped (B) (multi-alkoxy)silane as an internal electron donor compound. But this comparative feature is excluded by the aforementioned consists essentially of. Further, a comparative catalyst system made by contacting the comparative in situ blend with the activator would intrinsically have a different composition and polymerization function than the inventive catalyst system made from the inventive procatalyst system consisting essentially of the inventive blend. This is at least in part because the resulting comparative catalyst system would inherently contain trapped (B) (multi-alkoxy)silane as an internal electron donor compound.

The (A) pre-made solid procatalyst. The (A) pre-made solid procatalyst consists essentially of a titanium compound, magnesium chloride solids, and optionally a silica; wherein the magnesium chloride solids consist essentially of $MgCl_2$ and the oxaheterocycle. The term "pre-made" and the expressions "consist(s) essentially of" are consistent with, and reinforce, the aforementioned descriptions of the procatalyst system and the blend. Like the procatalyst system and the blend, the constituent (A) is free of a silicon atom-containing organic compound that is not the (B) (multi-alkoxy)silane and free of an oxygen-containing organic compound that is not the oxaheterocycle. The constituent (A) is also free of an activator, which otherwise would react therewith and make the catalyst system. Additionally, the constituent (A) is free of a nitrogen atom-containing compound that is an azaheterocycle. In some embodiments the constituent (A), blend made therefrom, the procatalyst system made therefrom, and the catalyst system made therefrom and is free of the silicon atom-containing organic compound that is not the (B) (multi-alkoxy)silane, and free of an oxygen-containing organic compound that is not the oxaheterocycle, and free of the azaheterocycle.

The constituent (A) is made in the absence of (B) and in the absence of any other electron donor organic compound (not counting the oxaheterocycle) and in the absence of activator. Constituent (A) is made by a process that consists essentially of solidifying magnesium chloride in the presence of the titanium compound and oxaheterocycle, but in the absence of the (B) (multi-alkoxy)silane and any other electron donor compound and activator.

The solidifying of the magnesium chloride makes the magnesium chloride solids consisting essentially of $MgCl_2$ and the oxaheterocycle. The magnesium chloride solids so made are free of (B) and the any other electron donor compound and activator.

The solidifying of the magnesium chloride may comprise precipitating and/or crystallizing $MgCl_2$ from a solution of magnesium chloride and the oxaheterocycle contained in a solvent. The solvent may be a hydrocarbon liquid, an excess amount of the oxaheterocycle, or a combination of the hydrocarbon liquid and the excess amount. Alternatively, the solidifying may comprise evaporating the solvent from the solution; alternatively the evaporating in combination with the precipitating and/or crystallizing. The solidifying may be performed at a temperature less than 100° C.

Embodiments of the method of making the (A) pre-made solid procatalyst comprise contacting magnesium chloride ($MgCl_2$) with at least one compound of formula (III): $TiX_4$ (III), wherein each X independently is Cl, Br, I, or a $(C_1\text{-}C_6)$alkoxy. In some aspects each X is Cl. In some embodiments each X is a $(C_1\text{-}C_6)$alkoxy, alternatively a $(C_4\text{-}C_6)$alkoxy. Some inventive embodiments of the method of making are those wherein each X is a $(C_1\text{-}C_6)$alkoxy, alternatively a $(C_4\text{-}C_6)$alkoxy (e.g., butoxy) and the (A) pre-made solid procatalyst has a titanium-to magnesium molar ratio (Ti/Mg (mol/mol)) and is free of at least one of a cyclic $(C_2\text{-}C_6)$ether, a $(C_1\text{-}C_6)$alcohol, or a hydroxyl-substituted cyclic $(C_3\text{-}C_7)$ether. Such inventive embodiments may be compared to a comparative pre-made solid procatalyst that is free of at least one of a cyclic $(C_2\text{-}C_6)$ ether, a $(C_1\text{-}C_6)$alcohol, or a hydroxyl-substituted cyclic $(C_3\text{-}C_7)$ether and wherein the comparative pre-made solid procatalyst has the same molar ratio of Ti/Mg (mol/mol) but the comparative pre-made solid procatalyst is made by a comparative method of making comprising contacting a magnesium alkoxide (e.g., $Mg((C_1\text{-}C_6)alkoxy)_2$) with at least one compound of formula (III): $TiX_4$ (III), wherein each X independently is Cl, Br, I, alternatively Cl. A comparative catalyst system made from the comparative pre-made solid procatalyst and an activator would have significantly lower catalytic activity compared to the catalytic activity of an embodiment of the inventive catalyst system made from the (A) pre-made solid procatalyst of the inventive embodiment and the same amount of activator.

The Cyclic ($C_2$-$C_6$)ether. A compound of formula

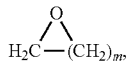

wherein subscript m is an integer from 1 to 6, alternatively from 2 to 5, alternatively from 3 to 4, alternatively 3. In some embodiments the cyclic ($C_2$-$C_6$)ether is tetrahydrofuran or tetrahydropyran, alternatively tetrahydrofuran.

The furan. A compound of formula

The dihydrofuran. A compound of formula

or

The pyran. A compound of formula

The dihydropyran. A compound of formula

The tetrahydropyran. A compound of formula

The 1,4-dioxane. A compound of formula

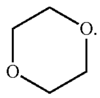

The difuranyl-($C_1$-$C_6$)alkylene. A compound of formula

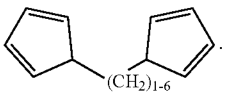

The bis(tetrahydrofuranyl)-($C_1$-$C_6$)alkylene. A compound of formula

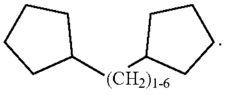 [SMILES: C1CCC(CC2CCCC2)C1]

The ($C_1$-$C_3$)alkyl-substituted derivative of any one thereof. Any one of the foregoing oxaheterocycle formulas wherein a hydrogen atom is replaced by a methyl, ethyl, 1-methylethyl, or propyl group.

The any other electron donor compound. The expression "any other electron donor compound" means an organic compound containing at least one heteroatom selected from N, O, S, P that is not the (B) (multi-alkoxy)silane or the at least one oxaheterocycle.

The (B) (multi-alkoxy)silane. A compound consisting essentially of, alternatively consisting of, per molecule, 1 silicon atom, from 2 to 4 silicon-and-carbon bonded oxygen atoms, at least 2 carbon atoms, and a plurality of hydrogen atoms.

The (B) (multi-alkoxy)silane is free of a carbon-carbon double and a carbon-carbon triple bond.

In some embodiments the (B) (multi-alkoxy)silane is a tetraalkoxysilane, a trialkoxysilane, an alkyltrialkoxysilane, or a dialkyldialkoxysilane.

The tetraalkoxysilane is a compound of formula (IIa) $Si(OR^2)_4$ (IIa); wherein each $R^2$ is independently defined as in formula (I) or (Ia).

The trialkoxysilane is a compound of formula (IIb) $HSi(OR^2)_3$ (IIb); wherein each $R^2$ is independently defined as in formula (I) or (Ia).

In some embodiments of formula (IIa) and (IIb), each $R^2$ is independently an unsubstituted ($C_1$-$C_{20}$)alkyl group, alternatively an unsubstituted ($C_1$-$C_5$)alkyl group, alternatively an unsubstituted ($C_1$-$C_3$)alkyl group (e.g., methyl or ethyl).

The alkyltrialkoxysilane is a compound of formula (IIc) $R^1Si(OR^2)_3$ (IIc); wherein $R^1$ is an unsubstituted ($C_1$-$C_{20}$)alkyl group or an unsubstituted ($C_3$-$C_{12}$)cycloalkyl group and each $R^2$ is independently defined as in formula (I) or (Ia). In some embodiments of formula (IIc), each $R^1$ is independently an unsubstituted ($C_1$-$C_{20}$)alkyl group, alternatively an unsubstituted ($C_1$-$C_5$)alkyl group, alternatively an unsubstituted ($C_1$-$C_3$)alkyl group (e.g., methyl or ethyl); and each $R^2$ is independently an unsubstituted ($C_1$-$C_{20}$)alkyl group, alternatively an unsubstituted ($C_1$-$C_5$)alkyl group, alternatively an unsubstituted ($C_1$-$C_3$)alkyl group (e.g., methyl or ethyl).

The dialkyldialkoxysilane is a compound of formula (IId) $R^1_2Si(OR^2)_2$ (IId); wherein each $R^1$ is independently an unsubstituted ($C_1$-$C_{20}$)alkyl group or an unsubstituted ($C_3$-$C_{12}$)cycloalkyl group and each $R^2$ is independently defined as in formula (I) or (Ia). In some embodiments of formula (IId), one $R^1$ is independently an unsubstituted ($C_1$-$C_{20}$)alkyl group, alternatively an unsubstituted ($C_1$-$C_5$)alkyl group, alternatively an unsubstituted ($C_1$-$C_3$)alkyl group (e.g., methyl or ethyl); and the other $R^1$ is an unsubstituted ($C_3$-$C_{12}$)cycloalkyl group, alternatively an unsubstituted ($C_5$-$C_7$)cycloalkyl group (e.g., cyclohexyl); and each $R^2$ is independently an unsubstituted ($C_1$-$C_{20}$)alkyl group, alternatively an unsubstituted ($C_1$-$C_5$)alkyl group, alternatively an unsubstituted ($C_1$-$C_3$)alkyl group (e.g., methyl or ethyl). In other embodiments of formula (IId), each $R^1$ independently is an unsubstituted ($C_3$-$C_{12}$)cycloalkyl group, alternatively an unsubstituted ($C_4$-$C_6$)cycloalkyl group (e.g., cyclopentyl); and each $R^2$ is independently an unsubstituted ($C_1$-$C_{20}$)alkyl group, alternatively an unsubstituted ($C_1$-$C_5$) alkyl group, alternatively an unsubstituted ($C_1$-$C_3$)alkyl group (e.g., methyl or ethyl).

Examples of suitable (B) (multi-alkoxy)silanes are tetraethoxysilane (i.e., $Si(OCH_2CH_3)_4$); propyltrimethoxysilane (i.e., $CH_3CH_2CH_2Si(OCH_3)_3$); dicyclopentyldimethoxysilane (i.e., $(C_5H_9)_2Si(OCH_3)_2$); and methyl, cyclohexyldimethoxysilane (i.e., $(CH_3)(C_6H_{11})Si(OCH_3)_2$).

The method of synthesizing the procatalyst system. During the synthesis the titanium compound, magnesium chloride, and the oxaheterocycle may be mixed in the hydrocarbon solvent. An embodiment of the method may synthesize the procatalyst system in a non-polymerization reactor that is free of an olefin monomer or a polyolefin polymer, and the procatalyst system may be removed from the non-polymerization reactor and, optionally, dried (the hydrocarbon solvent removed) to give the procatalyst system in isolated form or in isolated and dried form (as a powder). Alternatively, an embodiment of the method may synthesize the procatalyst system in situ in a feed tank, and the procatalyst system then fed into a polymerization reactor without the procatalyst system being isolated or dried. Alternatively, an embodiment of the method may synthesize the procatalyst system in situ in a polymerization reactor. The in situ method in the polymerization reactor may be performed in the absence, or in the presence, of the at least one olefin monomer and/or in the presence of the polyolefin polymer. The polymerization reactor may be a gas-phase polymerization reactor, alternatively a floating-bed, gas-phase polymerization reactor. The drying may comprise spray-drying. The (B) (multi-alkoxy)silane may be as defined in any one of aspects 1 to 3 and 13 or any one of the other aspects (numbered or unnumbered) described earlier.

The catalyst system. The catalyst system is a new type of Ziegler-Natta catalyst. The catalyst system is made by contacting the procatalyst system with an activator. The catalyst system beneficially has increased catalytic activity and/or makes a polyolefin polymer having a narrower molecular weight distribution ($M_w/M_n$) and/or a lower $M_z$, wherein $M_w$ is weight-average molecular weight, $M_n$ is number-average molecular weight, and $M_z$ is z-average molecular weight, all as measured according to the GPC Test Method described herein.

The activator. Also known as a cocatalyst. The activator may be an alkylaluminum compound. Preferably the alkylaluminum compound is a ($C_1$-$C_6$)alkylaluminum dichloride, a di($C_1$-$C_6$)alkyl-aluminum chloride, or a tri($C_1$-$C_6$)alkylaluminum. The activator may comprise a ($C_1$-$C_4$)alkyl-containing aluminum compound. The ($C_1$-$C_4$)alkyl-containing aluminium compound may independently contain 1, 2, or 3 ($C_1$-$C_4$)alkyl groups and 2, 1, or 0 groups each independently selected from chloride atom and ($C_1$-$C_4$)alkoxide. Each $C_1$-$C_4$)alkyl may independently be methyl; ethyl; propyl; 1-methylethyl; butyl; 1-methylpropyl; 2-methylpropyl; or 1,1-dimethylethyl. Each ($C_1$-$C_4$)alkoxide may independently be methoxide; ethoxide; propoxide; 1-methylethoxide; butoxide; 1-methylpropoxide; 2-methylpropoxide; or 1,1-dimethylethoxide. The ($C_1$-$C_4$)alkyl-containing aluminium compound may be triethylaluminum (TEA), triisobutylaluminum (TIBA), diethylaluminum chloride (DEAC), diethylaluminum ethoxide (DEAE), ethylaluminum dichloride (EADC), or a combination or mixture of any two or more thereof. The activator may be triethylaluminum (TEA), triisobutylaluminum (TIBA), diethylaluminum chloride (DEAC), diethylaluminum ethoxide (DEAE), or ethylaluminum dichloride (EADC). In some embodiments the activator is triethylaluminum (TEA).

The method of making the catalyst system. In some embodiments the procatalyst system is pre-made in situ and the method of making the catalyst system further comprises a preliminary step of pre-contacting the (A) pre-made solid procatalyst with the (B) (multi-alkoxy)silane for a period of time to make the procatalyst system in situ. The length of time for the pre-contacting step may be from 0.1 to 30 minutes (e.g., about 20 minutes), or longer. In another embodiment the activating effective amount of the activator is contacted with the procatalyst system in a polymerization reactor, thereby making the catalyst system in situ in the polymerization reactor. The (B) (multi-alkoxy)silane may be as defined in any one of aspects 1 to 3 and 13 or any one of the other aspects (numbered or unnumbered) described earlier.

In another embodiment of the method of making the catalyst system, the activating effective amount of the activator, the (B) (multi-alkoxy)silane, and the (A) pre-made solid procatalyst are contacted together simultaneously in a feed tank to make the catalyst system in situ in the feed tank, and then the catalyst system is fed into a polymerization reactor. In another embodiment the activating effective amount of the activator, the (B) (multi-alkoxy)silane, and the (A) pre-made solid procatalyst are fed separately into a polymerization reactor, wherein the activator, the (B) (multi-alkoxy)silane, and the (A) pre-made solid procatalyst are contacted together simultaneously to make the catalyst system in situ in the polymerization reactor. In another embodiment the activating effective amount of the activator is pre-contacted with the (B) (multi-alkoxy)silane to form a premixture consisting essentially of the activator and the (B) (multi-alkoxy)silane and free of the (A) pre-made solid procatalyst; and then the premixture is contacted with the (A) pre-made solid procatalyst to make the catalyst system in situ (either in a feed tank or in the polymerization reactor). The length of time for the pre-contacting step may be from 0.1 to 30 minutes (e.g., about 20 minutes), or longer.

The method of synthesizing the polyolefin polymer. The at least one olefin monomer may be as described below. In some embodiments there is one olefin monomer independently selected from ethylene, propylene, a ($C_4$-$C_8$)alpha-olefin, and 1,3-butadiene. In another embodiment there is a combination of any two or more olefin monomers. In the combination each olefin monomer independently may be selected from ethylene, propylene, and, optionally, 1,3-butadiene; alternatively ethylene and the ($C_4$-$C_8$)alpha-olefin.

Olefin monomer. Each olefin monomer independently may comprise ethylene, propylene, a ($C_4$-$C_{20}$)alpha-olefin, or a 1,3-diene. The ($C_4$-$C_{20}$)alpha-olefin is a compound of formula (III): $H_2C{=}C(H){-}R^*$ (III), wherein R* is a straight chain ($C_2$-$C_{18}$)alkyl group. Examples of R* are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_4$-$C_{20}$)alpha-olefin is 1-butene, 1-hexene, or 1-octene; alternatively 1-butene or 1-hexene; alternatively 1-butene; alternatively 1-hexene; alternatively 1-octene.

Polyolefin polymer. The polyolefin polymer is a macromolecule or collection of macromolecules having repeat units derived from the at least one olefin monomer. The polyolefin polymer may have a density from 0.89 to 0.98 gram per cubic centimeter (g/$cm^3$), as measured according to ASTM D792-08 (Method B, 2-propanol). The polyolefin polymer may be a linear low-density polyethylene (LLDPE), a low-density polyethylene (LDPE), a medium-density polyethylene (MDPE), or a high-density polyethylene (HDPE). In some embodiments the polyolefin polymer is the LLDPE. The polyolefin polymer may have a unimodal polyolefin polymer having a unimodal molecular weight distribution, $M_w/M_n$; or a multimodal polyolefin polymer having a multimodal molecular weight distribution, $M_w/M_n$; wherein the $M_w/M_n$ is determined by conventional gel permeation chromatography (GPC) according to the method described later, wherein $M_w$ is weight-average molecular weight and $M_n$ is number-average molecular weight. The multimodal polyolefin polymer may be a bimodal polyethylene polymer comprising a higher molecular weight (HMW) polyethylene constituent and a lower molecular weight (LMW) polyethylene constituent, wherein the bimodal polyethylene polymer has a bimodal molecular weight distribution, $M_w/M_n$. The polyolefin polymer may be a polyethylene homopolymer, a poly(ethylene-co-propylene) copolymer, a poly(ethylene-co-propylene-1,3-butadiene) terpolymer, or a poly(ethylene-co-($C_4$-$C_{20}$)alpha-olefin) copolymer. In some embodiments the polyolefin polymer is a poly(ethylene-co-1-alkene) copolymer, alternatively a poly(ethylene-co-($C_4$-$C_8$)1-alkene) copolymer, alternatively a poly(ethylene-co-1-hexene) copolymer.

Beneficial effects of inventive embodiments. We have discovered that a (multi-alkoxy)silane compound (a multidentate compound consisting of, per molecule, 1 silicon atom, at least two silicon-bonded oxygen atoms, carbon atoms, and hydrogen atoms) can be used as an external electron donor compound (EEDC) in the inventive procatalyst system made from a titanium compound, magnesium chloride, and an oxaheterocycle compound, which is used an internal electron donor compound (IEDC). The inventive catalyst system made therefrom and containing the (multi-alkoxy)silane compound as EEDC has improved catalyst productivity and makes an inventive polyolefin polymer having a lower melt flow ratio (MFR, $I_{21}/I_2$) and/or at least one narrower molecular weight distribution (lower $M_w/M_n$ and/or lower $M_z/M_w$) relative to MFR and/or $M_w/M_n$ and/or $M_z/M_w$, respectively, of comparative polyolefin polymer made with a comparative catalyst system that is free of the inventive (multi-alkoxy)silane compound as EEDC. These beneficial results are shown for a number of different embodiments of the inventive (pro)catalyst system and at different molar ratios of (B):Ti, and have been demonstrated for polymerization reactions run in a batch reactor and in a continuous fluidized bed gas phase reactor. Additionally, in embodiments of the inventive catalyst system that are made from embodiments of the inventive procatalyst system made from the titanium compound and a THF-solubilized $MgCl_2$ (i.e., wherein the oxaheterocycle is THF), the (B) (multi-alkoxy)silane also beneficially exhibits a capability for significantly decreasing molecular weight of the polyolefin polymer, resulting in substantial changes in $M_z(LS)/M_w(LS)$, $\Delta(M_z(LS)/M_w(LS))$, and $M_w3/M_w3(0)$.

In some embodiments the $M_z(LS)/M_w(LS) \leq 10$. In other embodiments $M_z(LS)/M_w(LS) \leq 10$ and at least one of limitations (i) and (ii) is met: (i) $M_z(LS)/M_w(LS)$ of the resulting inventive polyolefin (co)polymer is at least 50% less than $M_z(LS)/M_w(LS)$ of a comparative polyolefin (co)polymer obtained in the absence of the (B) (multi-alkoxy)silane (as EEDC); and (ii) the ratio of Mw3 of the resulting inventive polyolefin (co)polymer to Mw3 of the comparative polyolefin (co)polymer obtained in the absence of the (B) (multi-alkoxy)silane ("Mw3(0)") is less than 0.90.

In some embodiments the titanium compound is $TiCl_3$ or $TiCl_4$, or an oxaheterocycle a complex thereof, and the $MgCl_2$ is solubilized in the oxaheterocycle (e.g., THF). In such embodiments the inventive catalyst system may have an inventive catalyst productivity or inventive catalytic activity that is less than 90% of a comparative catalyst productivity or comparative catalytic activity, respectively; and/or the inventive catalyst system may have an inventive MFR ($I_{21}/I_2$) that is at least 1.2 lower, alternatively at least 1.5 lower, alternatively at least 1.8 lower than a comparative MFR ($I_{21}/I_2$) wherein the comparative properties are measured using a comparative catalyst system that is free of the (B) (multi-alkoxy)silane as EEDC and is obtained under the same polymerization conditions.

In some embodiments the titanium compound is $TiX_4$, wherein each X is a ($C_1$-$C_{12}$)alkoxy; or an oxaheterocycle a complex thereof, and the $MgCl_2$ is solubilized in the oxaheterocycle (e.g., THF). In such embodiments the inventive catalyst system may have an inventive catalyst productivity or inventive catalytic activity that is from 10% higher to 50% lower than a comparative catalyst productivity or comparative catalytic activity, respectively; and/or the inventive catalyst system may have an inventive MFR ($I_{21}/I_2$) that is at least 1.2 lower, alternatively at least 1.5 lower, alternatively at least 1.8 lower than a comparative MFR ($I_{21}/I_2$) wherein the comparative properties are measured using a comparative catalyst system that is free of the (B) (multi-alkoxy)silane as EEDC and is obtained under the same polymerization conditions.

Embodiments of the inventive Ziegler-Natta catalyst system may be made by contacting a pre-made Ziegler-Natta catalyst system, which is free of an external electron donor compound, with the (multi-alkoxy)silane compound, thereby making such embodiments of the inventive Ziegler-Natta catalyst system. The pre-made Ziegler-Natta catalyst system, used to make such embodiments, may be pre-made by contacting the Ziegler-Natta procatalyst system with an activator (e.g., an alkylaluminum compound), thereby pre-making the pre-made Ziegler-Natta catalyst system. Other embodiments of the inventive Ziegler-Natta catalyst system may be made by contacting the Ziegler-Natta procatalyst that is free of (i.e., in the absence of) an activator with the (multi-alkoxy)silane compound so as to make embodiments of the Ziegler-Natta procatalyst system, and then contacting these embodiments with the activator, thereby making such embodiments of the inventive Ziegler-Natta catalyst system. The latter embodiments of the inventive Ziegler-Natta catalyst system beneficially have higher catalytic activity and are capable of making a polyethylene (co)polymer having a decreased MFR. Decreased MFR is beneficial to improvement of impact strength and optic of polymer. Such inventive embodiments provide a low cost method to improve polymer properties. In addition, changes in polyolefin polymer properties correspond to changes in the (multi-alkoxy) silane donor/Ti ratio, enabling the inventive polymerization method to also provide an adjustable control for tuning polymer properties.

The direction and extent of benefits may be adjusted by selecting a different (B) (multi-alkoxy)silane in the inventive embodiments, as different embodiments of the (B) (multi-alkoxy)silane will have different amounts and types of external electron donor effects in the inventive catalyst system. Without being bound by theory, it is believed that the stronger the electron donating effect is of the (B) (multi-alkoxy)silane, the greater the extent is the external electron donor effect thereof.

The direction and extent of benefits of the (B) (multi-alkoxy)silane may also be adjusted by selecting an embodiment of the (B) (multi-alkoxy)silane that has three oxygen atoms per molecule (e.g., a (multi-alkoxy)silane of formula (IIb) or (IIc), of the (B) (multi-alkoxy)silane that has four oxygen atoms per molecule (e.g., a (multi-alkoxy)silane of formula (IIa), instead of two oxygen atoms per molecule (e.g., a (multi-alkoxy)silane of formula (IId)). Without being bound by theory, it is believed that the stronger the electron donating effect is of the (B) (multi-alkoxy)silane, the greater the extent is the external electron donor effect thereof.

General definitions. General definitions of a procatalyst composition of the Ziegler-Natta type, electron donor compound, external electron donor compound, internal electron donor compound, film, and polyethylene polymer follow.

Procatalyst composition (Ziegler-Natta-type). Generally a catalytic metal (e.g., a Group 4 element such as Ti, Zr, or Hf) supported on a 3-dimensional structure composed of a magnesium halide. Generally, the process of making the procatalyst composition uses a reaction mixture comprising a solvent and reactants comprising a magnesium halide and a titanium compound. The making comprises halogenating the titanium metal and titanating the magnesium halide in solution, and then solidifying the procatalyst composition.

Electron donor compound (EDC). Generally, an organic molecule containing carbon atoms, hydrogen atoms, and at least one heteroatom that has a free pair of electrons capable of coordinating to a metal atom in need thereof (e.g., a metal cation). The heteroatom may be selected from N, O, S, or P. Depending upon when or to which reactants the electron donor compound is added in a process of making a procatalyst composition, the electron donor compound may end up functioning in the procatalyst composition as an internal electron donor compound (IEDC) if added earlier or as an external electron donor compound (EEDC) if added later as described herein. Generally the terms “internal” and “external” indicate where the electron donor compound is located and what type of effect it has in the procatalyst composition containing same, which in turn are direct results of when or to which reactants the electron donor compound is added in a process of making a procatalyst composition.

External electron donor compound (EEDC). Also known as an external electron donor or external donor. The term “external” indicates that the electron donor compound is positioned, and has its main effect, on the outside or exterior of the 3-dimensional structure composed of magnesium halide in the procatalyst composition. These external features are accomplished by virtue of adding the electron donor compound to the procatalyst composition after the 3-dimensional structure composed of magnesium halide has been formed in the procatalyst composition. The resulting post-solidification presence of the electron donor compound enables it to donate at least one of its pair of electrons to one or more of Ti or Mg metals mostly on the exterior of the 3-dimensional structure composed of magnesium halide. Thus, without being bound by theory, it is believed that the electron donor compound, when employed as the external electron donor compound, affects the following properties of the polyolefin polymer made from the catalyst system made from the procatalyst composition, the properties comprising: level of tacticity (i.e., xylene soluble material), molecular weight and properties that are a function of at least molecular weight (e.g., melt flow), molecular weight distribution (MWD), melting point, and/or oligomer level.

Internal electron donor compound (IEDC). Also known as an internal electron donor or internal donor. The term “internal” indicates that the electron donor compound is positioned, and has its main effect, on the inside or in the interior of the 3-dimensional structure composed of magnesium halide in the procatalyst composition. These internal features are accomplished by virtue of adding the electron donor compound, or otherwise forming it in the presence of, the magnesium halide and titanium compound reactants during the making of the procatalyst composition. The resulting in situ presence of the electron donor compound enables it to donate at least one of its pair of electrons to one or more of Ti or Mg metals inside the 3-dimensional structure composed of magnesium halide in the procatalyst composition. The electron donor compound could not reach the inside or interior of the 3-dimensional structure composed of magnesium halide in the procatalyst composition if it instead had been added after the 3-dimensional structure composed of magnesium halide was formed. Thus, without being bound by theory, it is believed that the electron donor compound, when employed as the internal electron donor compound, is available to (1) regulate the formation of active sites in the (A) procatalyst composition, (2) regulate the position of titanium on the magnesium-based support in the procatalyst composition, thereby enhancing stereoselectivity of the procatalyst composition and ultimately enhancing the stereoselectivity of the catalyst system made therefrom, (3) facilitate conversion of the magnesium salt and titanium compound into their respective halide compounds, and (4) regulate the size of the magnesium halide solid (e.g., crystallite size) during conversion and solidification (e.g., crystallization) thereof. Thus, provision of the internal electron donor yields a procatalyst composition with enhanced stereoselectivity.

As used herein, the (B) (multi-alkoxy)silane is an EEDC, but not an IEDC.

Film. A manufactured article that is restricted in one dimension.

Low density. As applied to a polyethylene herein, having a density of from 0.910 to 0.929 g/$cm^3$, measured according to ASTM D792-08 (Method B, 2-propanol).

Medium density. As applied to a polyethylene herein, having a density of from 0.930 to 0.940 g/$cm^3$, measured according to ASTM D792-08 (Method B, 2-propanol).

High density. As applied to a polyethylene herein, having a density of from 0.941 to 0.970 g/$cm^3$, measured according to ASTM D792-08 (Method B, 2-propanol).

Homopolymer. A polymer derived from one species of monomer. As IUPAC teaches, the species may be real (e.g., ethylene or a 1-alkene), implicit (e.g., as in poly(ethylene terephthalate)), or hypothetical (e.g., as in poly(vinyl alcohol)).

The relative terms “higher” and “lower” in the HMW polyethylene constituent and the LMW polyethylene constituent, respectively, are used in reference to each other and merely mean that the weight-average molecular weight of the HMW polyethylene constituent ($M_{w-HMW}$) is greater than the weight-average molecular weight of the LMW polyethylene constituent ($M_{w-LMW}$), i.e., $M_{w-HMW}>M_{w-LMW}$.

Any compound, composition, formulation, mixture, or product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that any required chemical elements (e.g., C and H required by a polyolefin; or C, H, and O required by an alcohol) are not excluded.

Alternatively precedes a distinct embodiment. Aspect means an embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. Terms used herein have their IUPAC meanings unless defined otherwise. For example, see IUPAC's *Compendium of Chemical Terminology. Gold Book*, version 2.3.3, Feb. 24, 2014. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. In mathematical equations, "*" indicates multiplication and "/" indicates division.

For property measurements, samples are prepared into test specimens, plaques, or sheets according to ASTM D4703-10, Standard Practice for Compression Molding Thermoplastic Materials into Test Specimens, Plaques, or Sheets.

Density is measured according to ASTM D792-08, *Standard Test Methods for Density and Specific Gravity* (*Relative Density*) *of Plastics by Displacement*, Method B (for testing solid plastics in liquids other than water, e.g., in liquid 2-propanol). Report results in units of grams per cubic centimeter ($g/cm^3$; also written as g/cc).

Gel Permeation Chromatography (GPC) Test Method (Conventional GPC):

Instrumentation and eluent. The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used. The autosampler oven compartment was set at 160° C. and the column compartment at 150° C. The columns used were three Agilent "Mixed B" 30-centimeters (cm) 20-micrometers (μm) linear mixed-bed columns. Used nitrogen gas-sparged chromatographic solvent "TCB" having 1,2,4 trichlorobenzene that contained 200 ppm of butylated hydroxytoluene (BHT). The injection volume used was 200 microliters (μL) and the flow rate was 1.0 milliliters/minute (mL/min.).

Calibration. Calibrate the GPC column set with at least 20 narrow molecular weight distribution polystyrene standards from Agilent Technologies with molecular weights ranging from 580 to 8,400,000 grams per mole (g/mol). These were arranged in 6 "cocktail" mixtures with at least a "decade" of separation between individual molecular weights. The polystyrene standards were prepared at a concentration of 0.025 grams (g) polystyrene in 50 mL of solvent for molecular weights equal to or greater than 1,000,000, and 0.05 g polystyrene in 50 mL of solvent for molecular weights less than 1,000,000. The polystyrene standards were dissolved in the solvent at 80° C. with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).: $M_{polyethylene}=A*(M_{polystyrene})^B$ (EQ. 1), wherein $M_{polyethylene}$ is the molecular weight of polyethylene, $M_{polystyrene}$ is the molecular weight of polystyrene, A has a value of 0.4315, and B is equal to 1.0. A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at $M_w$ 52,000 g/mol.

Total Plate Count and Symmetry. The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection. Plate Count=5.54*[($RV_{Peak\ Max}$)/Peak Width at half height)]$^2$ (EQ. 2), wherein $RV_{Peak\ Max}$ is the retention volume in milliliters at the maximum height of the peak, the peak width is in milliliters, half height is one-half (½) height of the peak maximum. Symmetry=(Rear Peak $RV_{one\ tenth\ height}$−$RV_{Peak\ Max}$)/($RV_{Peak\ Max}$−Front Peak $RV_{one\ tenth\ height}$)) (EQ. 3), wherein Rear Peak $RV_{one\ tenth\ height}$ is the retention volume in milliliters at one tenth peak height of the peak tail, which is the portion of the peak that elutes later than the Peak Max, $RV_{Peak\ Max}$ is as defined for EQ. 2, and Front Peak $RV_{one\ tenth\ height}$ is the retention volume in milliliters at one tenth peak height of the peak front, which is the portion of the peak that elutes earlier than the Peak Max. The chromatographic system's plate count value from EQ. 2 should be greater than 24,000 and its symmetry should be between 0.98 and 1.22.

Test Sample Preparation. Samples of polyolefin polymer for GPC testing were prepared in a semi-automatic manner with the PolymerChar "Instrument Control" Software, wherein concentrations of the samples were weight-targeted at 2 milligrams per milliliter (mg/mL), and the TCB solvent was added to a pre nitrogen gas-sparged septa-capped vial, via the PolymerChar high temperature autosampler. The samples were dissolved for 2 hours at 160° C. under "low speed" shaking.

Molecular Weights Calculations. The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from EQ. 1.

$$Mn_{(GPC)} = \frac{\sum^{i} IR_i}{\sum^{i} \left(IR_i / M_{polyethylene_i}\right)} \quad \text{(EQ. 4)}$$

$$Mw_{(GPC)} = \frac{\sum^{i} \left(IR_i * M_{polyethylene_i}\right)}{\sum^{i} IR_i} \quad \text{(EQ. 5)}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{(EQ. 6)}$$

$M_w/M_n$ represents the breadth of molecular weight distribution of a polymer. $M_z/M_w$ is used as an indicator for presence of high molecular polymer chain. The percentage difference between the $M_z/M_w$ of a polymer obtained from using an external donor ($M_z(1)/M_w(1)$) and that without using an external donor ($M_z(0)/M_w(0)$) under the same polymerization condition, $\Delta(M_z/M_w)\%$, is calculated to reflect the change in high molecular weight content in the polymer in the presence of the external donor. $\Delta(M_z/M_w)\%=(M_z(1)/M_w(1)-M_z(0)/M_w(0))/M_z(0)/M_w(0)*100$ (EQ. 7).

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 8. Processing of the flow marker peak was done via the PolymerChar GPCOne™ Software. Acceptable flowrate correction is such that the effective flowrate should be within +/−2% of the nominal flowrate.

$$\text{Flowrate(effective)}=\text{Flowrate(nominal)}*(\text{RV(FM Calibrated)}/\text{RV(FM Sample)}) \quad \text{(EQ. 8)}.$$

Hexane Extractables Content Test Method: Measured according to a procedure that follows both the Food and Drug Administration (FDA) procedure for determining the hexane extractable portion of Homopolymer and Copolymer Polyethylene and Copolymer Polypropylene (Title 21 Code of Federal Regulations (C.F.R.) § 177.1520 (d)(3)(ii) Paragraphs e-i) (option 2) 4-1-2001 edition and ASTM D5227-13, *Standard Test Method for Measurement of Hexane Extractable Content of Polyolefins*.

High Load Melt Index (Flow Index) Test Method ("HLMI" or "FI" or "$I_{21}$"): use ASTM D1238-10, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index Test Method ("$I_2$"): for ethylene-based (co) polymer is measured according to ASTM D1238-13, using conditions of 190° C./2.16 kg.

Melt Index Test Method ("$I_5$"): for ethylene-based (co) polymer is measured according to ASTM D1238-13, using conditions of 190° C./5.0 kg.

Melt Flow Ratio MFR5: ("$I_{21}/I_5$") Test Method: calculated by dividing the value from the HLMI $I_{21}$ Test Method by the value from the Melt Index $I_5$ Test Method.

Improved Comonomer Content Distribution (iCCD) Test Method:

Improved comonomer content distribution (iCCD) analysis was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before IR-5 detector in the detector oven. Ortho-dichlorobenzene (ODCB, 99% anhydrous grade or technical grade) was used. Silica gel 40 (particle size 0.2-0.5 mm, catalogue number 10181-3) from EMD Chemicals was obtained (can be used to dry ODCB solvent before). The CEF instrument is equipped with an autosampler with $N_2$ purging capability. ODCB is sparged with dried nitrogen gas ($N_2$) for one hour before use. Sample preparation was done with autosampler at 4 mg/mL (unless otherwise specified) under shaking at 160° C. for 1 hour. The injection volume was 300 μL. The temperature profile of iCCD was: crystallization at 3° C./min from 105° to 30° C., the thermal equilibrium at 30° C. for 2 minutes (including Soluble Fraction Elution Time being set as 2 minutes), elution at 3° C./minute from 30° to 140° C. The flow rate during crystallization is 0.0 milliliter per minute (mL/min.). The flow rate during elution is 0.50 mL/min. The data were collected at one data point/second. The iCCD column was packed with gold coated nickel particles (Bright 7GNM8-NiS, Nippon Chemical Industrial Co.) in a 15 cm (length) by 0.635 cm (¼") (ID) stainless tubing. The column packing and conditioning were with a slurry method according to the reference (Cong, R.; Parrott, A.; Hollis, C.; Cheatham, M. WO2017/040127A1). The final pressure with TCB slurry packing was 15 megapascals (Mpa; 150 bars).

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL.

The modeling of the reported elution peak temperatures as a function of octene mole% using linear regression resulting in the model of Equation 12 (EQ. 12) for which statistical coefficient of determination, $r^2$, was 0.978. (Elution Temperature)=−6.3515(1-octene mole percent)+101.000 (EQ. 12).

For the whole resin, integration windows are set to integrate all the chromatograms in the elution temperature (temperature calibration is specified above) range from 23.0° to 115° C. The eluted components from the CCD analysis of an ethylene/alpha-olefin copolymer resin comprise a high density fraction (HDF or Wt3), a copolymer fraction (Wt2), and a purge fraction (PF or Wt1).

The weight percentage of the high density polyolefin fraction of the resin (HDF, or Wt3) is defined by the following Equation 13 (EQ. 13): HDF or Wt3=100%*(integrated area of elution window 94.5° to 115° C.)/(integrated area of entire elution window 23° to 115° C.) (EQ. 13).

The weight percentage of copolymer fraction of the resin (Wt2) is defined by Equation 14 (EQ. 14): Wt2=100%* (integrated area of elution window 35° to 94.5° C.)/(integrated area of entire elution window 23° to 115° C.) (EQ. 14).

The weight percentage of purge fraction of the resin (PF or Wt1) is defined by Equation 15 (EQ. 15): Wt1=100%* (integrated area of elution window 23° to 35° C.)/(integrated area of entire elution window 23° to 115° C.) (EQ. 15).

A plot of iCCD has a peak temperature Tp3 for high density fraction Wt3, a peak temperature Tp2 for the copolymer fraction Wt2, and a peak temperature Tp1 for the purge fraction Wt1. The high density fraction or Wt3 has a weight-average molecular weight Mw3, the copolymer fraction Wt2 has a weight-average molecular weight Mw2, and the purge fraction Wt1 has a weight-average molecular weight Mw1.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Baselines were subtracted from LS, and concentration detector chromatograms. Integration windows are set to integrate all the chromatograms in the elution temperature (temperature calibration is specified above) range from 23.0° to 120° C.

The weight-average molecular weights Mw3, Mw2, and Mw1 are calculated from iCCD using the following steps (1) to (4). (1): Measure interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0 g/10 min., MWD ($M_w/M_n$) approximately 2.6 by conventional gel permeation chromatography) is used. Same experimental conditions as the normal iCCD method above are used except the following parameters: crystallization at 10° C./min from 140° to 137° C., the thermal equilibrium at 137° C. for 1 minute as Soluble Fraction Elution Time, soluble fraction (SF) time of 7 minutes, elution at 3° C./min from 137° to 142° C. The flow rate during crystallization is 0.0 mL/min. The flow rate during elution is 0.80 mL/min. Sample concentration is 1.0 mg/mL. (2): Each LS data point in LS chromatogram is shifted to correct for the interdetector offset before integration. (3): Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals. (4): Mw of the polymer was calculated by using the ratio of integrated light scattering detector (90 degree angle) to the concentration detector and using the MW detector constant.

EXAMPLES

Preparation 1 (Prep1): synthesis of a spray-dried particulate solid consisting essentially of a hydrophobic fumed silica, $MgCl_2$, and THF. Add anhydrous tetrahydrofuran (14 kg) to a feed tank. Next add finely-divided solid $MgCl_2$ (1255 g). Heat mixture to 60° C., and mix it for 5 hours to overnight to form a solution. Cool the solution to 40° C. to 45° C. Then add hydrophobic fumed silica (Cabosil TS-610, 1.6 kg) to give a suspension. Mix the suspension for 30 minutes to give a slurry of a hydrophobic fumed silica in a THF solution of $MgCl_2$. Spray the slurry in a spray dryer using the following conditions: inlet temperature 160C, outlet temperature 110° C., feed rate approximately 45 kg per hour, total gas flow approximately 270 kg per hour, atomizer speed: varied typically approximately 85%, to give the spray-dried particulate solid of Prepi, having expected d50 particle size from 18 to 25 micrometers.

Synthesis of (A) pre-made solid procatalyst examples PCAT-1 to PCAT-3.

PCAT-1: A spray-dried procatalyst prepared according to the method in U.S. Pat. No. 9,988,475B2, column 7, line 64, to column 8, line 47, to give PCAT-1. PCAT-1 contains 2.3 wt % of Ti and 26.8 wt % of tetrahydrofuran (THF) as internal electron donor compound.

PCAT-2: A slurry of PCAT-1 in mineral oil is charged to a container. Tri-n-hexylaluminum (TnHAl) is added to the container at molar ratio of 0.20 mol TnHAl/1.00 mol THF, and allowed to mix for one hour. Afterward, diethylaluminum chloride (DEAC) is added to the mixture at molar ratio of 0.45 mol DEAC/1.00 mol THF and allowed to mix for one hour to give PCAT-2.

PCAT-3: synthesis of a spray-dried Ziegler-Natta procatalyst system. Mix 150 g of the spray-dried particulate solid of Prepi, 520 g of a mineral oil, and 73.5 g of EADC at 30° C. for 0.5 hour to give an intermediate mixture consisting essentially of, or being a reaction product made from, the spray-dried particulate solid, mineral oil, and EADC. The intermediate mixture is free of $Ti(OiPr)_4$. Then combine the intermediate mixture with 8.7 g of $Ti(OiPr)_4$ at 30° C. for 2 hours to give PCAT-3 in mineral oil. PCAT-3 contains Ti and THF as internal electron donor. $MgCl_2$ is solubilized in THF during procatalyst preparation.

Selection of (B) (multi-alkoxy)silane examples 1 to 4 and 20 to 25 are referred to herein as External Electron Donor Compounds 1 to 4 (EEDC-1 to EEDC-4). These are listed in Table B.

All EEDC-1 to EEDC-4 are used in the working examples as 0.20 molar (M) solutions thereof in alkanes solvent (Isopar E).

TABLE B

Listing of External Electron Donor Compounds (EEDCs).

| EEDC | Compound Name | Type |
|---|---|---|
| EEDC-1 | tetraethoxysilane | (B) (multi-alkoxy)silane |
| EEDC-2 | propyltrimethoxysilane | (B) (multi-alkoxy)silane |
| EEDC-3 | dicyclopentyldimethoxysilane | (B) (multi-alkoxy)silane |
| EEDC-4 | methyl,cyclohexyldimethoxysilane | (B) (multi-alkoxy)silane |

Examples of inventive and comparative procatalyst systems, and examples of inventive and comparative catalyst systems made therefrom, may be made by using different steps or different orders of steps. Examples of these different modes of making include modes M-1 to M-3 described below. Modes M-1 to M-3 vary addition of system components (constituents or reactants) triethylaluminum (TEA), one of (B) examples EEDC-1 to EEDC-25 (if used), and one of (A) pre-made solid procatalyst examples PCAT-1 to PCAT-4.

Addition Mode M-1: TEA, one of EEDC-1 to EEDC-4 (if used), and one of PCAT-1 to PCAT-4 contacting with each other for about 20 minutes before the resulting mixture is injected into a polymerization reactor.

Addition Mode M-2: contact TEA and one of EEDC-1 to EEDC-4 with each other for about 20 minutes, and add the pre-mixture into a polymerization reactor, and then add one of PCAT-1 to PCAT-4 into the reactor.

Addition Mode M-3: first TEA added into a polymerization reactor, followed by addition of a procatalyst system that has been pre-made by contacting one of EEDC-1 to EEDC-4 with one of PCAT-1 to PCAT-4 for about 20 minutes.

For comparative examples, wherein no EEDC is used, addition modes M-2 and M-3 are effectively the same.

Continuous Fluidized-Bed Gas-Phase Polymerization Procedure.

Procatalyst (PCAT-1 or PCAT-3) is injected as a slurry into a fluidized bed gas phase polymerization reactor. Triethylaluminum (TEA) cocatalyst is fed to the fluidized bed reactor as a 2.5 wt. % solution in isopentane. When an EEDC is used, it is fed to the fluid bed reactor as a solution in isopentane. The polymerization is conducted in a 13.25 inch ID diameter gas-phase fluidized bed reactor. Ethylene, hydrogen, 1-hexene and nitrogen are continuously fed to the cycle gas loop just upstream of the compressor at quantities sufficient to maintain the desired gas concentrations. Product polyethylene is removed from the reactor in discrete withdrawals to maintain a bed weight lower than a desired maximum value. The polymerization process is conducted according to the process conditions reported in Table C. Catalyst activity is calculated based on the amount of polymer produced and the amount of procatalyst fed. Additionally, the procatalyst residual metals in the polyethylene or polyolefin can be measured, and the catalyst activity can be determined using the residual metals and the known or measured metal content in the procatalyst before polymerization.

TABLE C

Continuous Fluidized-Bed Gas-Phase Polymerization Process and Results for making a poly(ethylene-co-1-hexene) copolymer or polyethylene homopolymer.

| Example | CE-P1 | IE-P1 | CE-P2 | IE-P2 | CE-P3 | IE-P3 | CE-P4 | IE-P4 |
|---|---|---|---|---|---|---|---|---|
| PCAT | 1 | 1 | 1 | 1 | 1 | 1 | 3 | 3 |
| Temperature (° C.) | 95.0 | 95.0 | 95.0 | 95.0 | 95.0 | 95.0 | 95.0 | 95.0 |
| Pressure (Mpa) | 2.41 | 2.40 | 2.41 | 2.41 | 2.40 | 2.40 | 2.41 | 2.41 |
| Ethylene Partial Pressure (Mpa) | 0.90 | 0.90 | 0.87 | 0.90 | 0.90 | 0.90 | 0.90 | 0.90 |
| $H_2/C_2$ Molar Ratio (mol/mol) | 0.330 | 0.388 | 0.469 | 0.545 | 0.264 | 0.279 | 0.495 | 0.499 |
| 1-Hexene/ Ethylene Molar Ratio (mol/mol) | 0.025 | 0.031 | 0.029 | 0.030 | 0 | 0 | 0.018 | 0.014 |
| Isopentane amount (mol %) | 4.97 | 5.05 | 4.80 | 5.04 | 5.03 | 5.04 | 5.00 | 5.00 |
| Procatalyst Feed Rate (cc/hour) | 2.0 | 2.7 | 2.0 | 2.8 | 1.8 | 3.0 | 4.1 | 8.0 |
| Activator | TEA | TEA | TEA | TEA | TEA | TEA | TEA | TEA |
| Activator Conc. (wt %) | 2.50 | 2.50 | 2.50 | 2.50 | 2.50 | 2.50 | 2.50 | 2.50 |
| Cocatalyst Feed Rate (cc/hour) | 88.8 | 160.7 | 84.0 | 167.1 | 109.2 | 155.8 | 176.0 | 347.4 |
| EEDC | None | EEDC-3 | None | EEDC-3 | None | EEDC-3 | EEDC-3 | EEDC-3 |
| EEDC Conc. wt %) | | 0.30 | | 0.30 | | 0.30 | | 1.25 |
| EEDC Feed Rate (cc/hour) | | 167.0 | | 187.9 | | 168.1 | | 267.3 |
| EEDC/Ti Ratio (mol/mol) | 0 | 3.24 | 0 | 3.49 | 0 | 2.61 | 0 | 25 |
| Superficial Gas Velocity (SGV, m/sec) | 0.50 | 0.56 | 0.47 | 0.53 | 0.57 | 0.57 | 0.55 | 0.55 |
| Bed Height (m) | 2.12 | 2.32 | 1.97 | 2.30 | 1.97 | 1.97 | 2.44 | 2.44 |
| Bed Weight (kg) | 42.5 | 40.0 | 43.5 | 43.6 | 52.9 | 46.4 | 54.6 | 59.1 |
| Fluidized Bed Density (kg/$m^3$) | 226 | 195 | 249 | 214 | 303 | 267 | 258 | 223 |
| Bed Volume ($m^3$) | 0.19 | 0.21 | 0.18 | 0.20 | 0.18 | 0.17 | 0.21 | 0.23 |
| Residence Time (hour) | 2.47 | 2.50 | 2.77 | 2.74 | 2.81 | 2.62 | 3.2 | 2.4 |
| Space Time Yield (STY, kg/hr/$m^3$) | 163 | 124 | 165 | 123 | 192 | 181 | 95 | 110 |
| Melt Index ($I_2$) (dg/min.) | 3.7 | 3.57 | 9.6 | 10.11 | 1.25 | 1.20 | 10.34 | 9.53 |
| Resin Density (g/cc) | 0.949 | 0.95 | 0.952 | 0.95 | 0.96 | 0.96 | 0.952 | 0.952 |
| MFR ($I_{21}/I_2$) | 24.27 | 21.43 | 24.13 | 22.59 | 27.36 | 23.80 | 25.85 | 20.73 |
| Al/Ti (mol/mol) | 38.82 | 51.84 | 36.73 | 51.77 | 52.38 | 45.40 | 191 | 193 |
| Bulk Density (kg/$m^3$) | 315 | 272 | 347 | 301 | 416 | 376 | 386 | 374 |
| Catalyst Productivity (kg/kg) | 34,830 | 24,155 | 31,887 | 22,841 | 41,657 | 24,038 | 24278 | 15290 |

"IE" in an example number indicates the example is an Inventive Example. "CE" in an example number indicates the example is a Comparative Example, i.e., not inventive.

TABLE D

Effects of EEDC-3 on PCAT-1 and PCAT-3: GPC Results for poly(ethylene-co-1-hexene) copolymer.

| Ex. | Compositional GPC Results $M_w$ | $M_z$ | $M_w$/ $M_n$ | $M_z$/ $M_w$ | $M_w$ (LS) | $M_z$ (LS) | Mz/ $M_w$ (LS) | $\Delta$($M_z$/ $M_w$ (LS) (%) | SCB/ 1000TC |
|---|---|---|---|---|---|---|---|---|---|
| CE-P1 | 92,081 | 386,290 | 4.56 | 4.20 | 120,466 | 738,199 | 22.7 | 0 | 2.29 |
| IE-P1 | 84,840 | 249,303 | 3.91 | 2.94 | 86,178 | 290,822 | 4.65 | −80 | 1.97 |
| CE-P2 | 70,644 | 297,968 | 4.52 | 4.22 | 89,736 | 609,839 | 26.5 | 0 | 2.21 |
| IE-P2 | 65,130 | 181,908 | 3.86 | 2.79 | 67,048 | 215,864 | 4.2 | −84 | 2.15 |
| CE-P3 | 127,295 | 539,826 | 5.22 | 4.24 | 162,190 | 897,175 | 14.6 | 0 | −0.24 |
| IE-P3 | 122,645 | 415,508 | 4.46 | 3.39 | 125,857 | 501,099 | 5.3 | −64 | −0.28 |
| CE-P4 | 71,169 | 297,025 | 4.56 | 4.17 | 85,555 | 507,547 | 15.4 | 0 | 2.81 |
| IE-P4 | 65,504 | 174,717 | 3.68 | 2.67 | 65,446 | 186,058 | 3.0 | −81 | 2.44 |

TABLE E

Effects of EEDC-3 on PCAT-1 and PCAT-3: iCCD Results for poly(ethylene-co-1-hexene) copolymer.

| Ex. | iCCD Results Wt 1 | Wt 2 | Wt 3 | Tp1 (° C.) | Tp3 (° C.) | Mw1 | Mw2 | Mw3 | Mw3/ Mw3(0) |
|---|---|---|---|---|---|---|---|---|---|
| CE-P1 | 0.42 | 27.9 | 71.7 | 29.7 | 99.9 | 54,916 | 34,871 | 135,422 | 1 |
| IE-P1 | 0.38 | 25.8 | 73.8 | 29.6 | 100 | 72,457 | 36,643 | 98,634 | 0.73 |
| CE-P2 | 0.63 | 32.2 | 67.1 | 29.7 | 99.8 | 38,927 | 25,144 | 115,003 | 1 |
| IE-P2 | 0.57 | 28.1 | 71.3 | 29.6 | 100 | 78,569 | 23,914 | 81,002 | 0.70 |
| CE-P3 | 0.32 | 6.3 | 93.3 | 29.7 | 101 | 121,056 | 98,191 | 149,172 | 1 |
| IE-P3 | 0.28 | 5.2 | 94.5 | 29.8 | 101 | 83,907 | 55,892 | 117,879 | 0.79 |
| CE-P4 | 0.69 | 33.1 | 66.2 | 29.7 | 99.8 | 26,871 | 23,685 | 108,619 | 1 |
| IE-P4 | 0.65 | 27.4 | 71.9 | 29.8 | 100 | 36,651 | 20,814 | 78,262 | 0.72 |

Batch Reactor Slurry-Phase Polymerization Procedure. The slurry phase reactor employed is a 2 liter, stainless steel autoclave equipped with a mechanical agitator. The reactor was cycled several times through a heat and nitrogen purge step to ensure that the reactor was clean and under an inert nitrogen atmosphere. Approximately 1 L of liquid isobutane is added to the reactor at ambient temperature. The reactor agitator is turned on and set to 750 rpm. Desired amounts of hydrogen ($H_2$) and 1-hexene are loaded into the reactor. The amount of $H_2$ is measured as liter (L) under STP (standard temperature and pressure). The reactor is heated to desired polymerization temperature. Ethylene is introduced to achieve a 125 psi differential pressure. The amount of procatalyst (solid weight) used in the batch reactor polymerization reactions: 10.0 mg for PCAT-1, 15.0 mg for PCAT-2, and 10.0 mg for PCAT-3. Activator (cocatalyst) TEA (triethylaluminum) or TMA (trimethylaluminum), external donor, and procatalyst are added from a shot cylinder using nitrogen pressure according to the catalyst component addition modes described above. The polymerization reaction proceeds at 85° C. and ethylene is added continuously to maintain constant pressure. After 1 hour, the reactor is vented, cooled to ambient temperature, opened, and the poly(ethylene-co-1-hexene) copolymer product is recovered. Tests are performed on the polymer sample after drying.

Catalyst productivity is calculated as grams of polymer produced per gram of procatalyst per hour. The percentage change in catalyst productivity due to the inclusion of EEDC, $\Delta$(Cat. Prod.) (%), is calculated by subtracting the catalyst productivity by the catalyst productivity in the absence of EEDC and then dividing the difference by the catalyst productivity in the absence of EEDC times 100.

Batch Reactor Polymerization Results: Effects of (Multi-Alkoxy)Silane External Donors Under the Same Polymerization Conditions.

TABLE 1A

Effects of EEDC-1 and EEDC-2 on PCAT-1: Batch Reactor Polymerization Results (addition mode M-1, activator TEA, 1 -hexene 210 mL, $H_2$ 7 L, Al/Ti 150 mol/mol) and properties of the poly(ethylene-co-1-hexene) copolymer product.

| Ex. | EEDC | EEDC/Ti (Mol/ Mol) | Cat. Prod. (g PE/g-hr) | $\Delta$(Cat. Prod.) (%) | $I_2$ (g/10 min) | $I_{21}$/ $I_2$ | $\Delta$($I_{21}$/ $I_2$) |
|---|---|---|---|---|---|---|---|
| CE1 | none | 0 | 7,382 | 0 | 17.2 | 27.1 | 0 |
| IE1 | 1 | 2 | 5,281 | −28 | 8.8 | 23.8 | −3.3 |
| IE2 | 1 | 5 | 2,215 | −70 | 4.5 | 23.4 | −3.7 |
| IE3 | 1 | 10 | 1,588 | −78 | 4.2 | 23.3 | −3.7 |
| IE4 | 2 | 2 | 6,436 | −13 | 8.3 | 25.2 | −1.9 |
| IE5 | 2 | 5 | 2,366 | −68 | 4.4 | 23.8 | −3.3 |
| IE6 | 2 | 10 | 1,292 | −82 | 3.0 | 24.4 | −2.7 |

In Table 1A, the (B) (multi-alkoxy)silane that is tetraethoxysilane (EEDC-1) or n-propyltrimethoxysilane (EEDC-2) is used as an external electron donor compound in the inventive embodiments of the catalyst system, which produce poly(ethylene-co-1-hexene) copolymers with significantly lower $I_{21}/I_2$ (IE1 to IE3 and IE4 toIE6 versus CE1 in Table 1A). As the EEDC/Ti molar ratio increases, the catalyst productivity decreases and the melt index $I_2$ of the poly(ethylene-co-1-hexene) copolymer product decreases.

TABLE 1B

Effects of EEDC-1 and EEDC-2 on PCAT-1: poly(ethylene-co-1-hexene) copolymer GPC Results

| Ex. | Compositional GPC Results | | | | | | | | |
|---|---|---|---|---|---|---|---|---|---|
| | $M_w$ | $M_z$ | $M_w/M_n$ | $M_z/M_w$ | $M_w$ (LS) | $M_z$ (LS) | $M_z/M_w$ (LS) | $\Delta(M_z/M_w)$ (LS) (%) | SCB/1000 TC |
| CE1 | 61,714 | 224,322 | 3.87 | 3.63 | 73,024 | 1,876,787 | 25.70 | 0 | 8.6 |
| IE1 | 70,059 | 200,038 | 3.69 | 2.86 | 70,352 | 248,593 | 3.53 | −86 | 6.1 |
| IE2 | 84,607 | 243,309 | 3.63 | 2.88 | 82,012 | 247,341 | 3.02 | −88 | 3.7 |
| IE3 | 84,910 | 232,729 | 3.54 | 2.74 | 80,985 | 223,671 | 2.76 | −89 | 3.0 |
| IE4 | 68,851 | 187,092 | 3.62 | 2.72 | 71,499 | 267,408 | 3.74 | −85 | 5.3 |
| IE5 | 83,958 | 226,981 | 3.50 | 2.70 | 81,125 | 228,600 | 2.82 | −89 | 3.6 |
| IE6 | 92,411 | 248,629 | 3.46 | 2.69 | 91,067 | 265,373 | 2.91 | −89 | 2.1 |

Analysis by triple detector GPO shows there is a substantial reduction in high molecular weight component (representing by $M_Z$ (LS) from light scattering ("LS") detector). Polyolefin polymers made from inventive catalyst systems containing the (B) (multi-alkoxy)silane as external electron donor compound exhibit a significant decrease in the $M_z$(LS)/$M_w$(LS) ratio (IE1 to IE3 and IE4 to IE6 versus CE1 in Table 11B). A higher EEDC/Ti molar ratio leads to lower comonomer content (SCB/1000 TO) in the poly(ethylene-co-1-hexene) copolymer. Additionally, the decrease in $M_w/M_n$ of the poly(ethylene-co-1-hexene) copolymer is consistent with the poly(ethylene-co-1-hexene) copolymer's change in $I_{21}/I_2$ in Table 1A.

TABLE 1C

Effects of EEDC-1 and EEDC-2 on PCAT-1: iCCD Results of poly(ethylene-co-1-hexene) copolymer.

| Ex. | EEDC | iCCD Results | | | | | | | | |
|---|---|---|---|---|---|---|---|---|---|---|
| | | Wt 1 | Wt 2 | Wt 3 | Tp1 (° C.) | Tp3 (° C.) | Mw1 | Mw2 | Mw3 | Mw3/Mw3(0) |
| CE1 | none | 0.05 | 0.60 | 0.35 | 29.7 | 99.2 | 13,974 | 41,851 | 122,280 | 1 |
| IE1 | 1 | 0.02 | 0.52 | 0.46 | 30.0 | 99.2 | 21,310 | 42,036 | 100,015 | 0.82 |
| IE2 | 1 | 0.02 | 0.43 | 0.55 | 30.0 | 99.5 | 15,263 | 43,420 | 102,425 | 0.84 |
| IE3 | 1 | 0.02 | 0.42 | 0.57 | 29.9 | 99.6 | 9,457 | 42,669 | 102,232 | 0.84 |
| IE4 | 2 | 0.02 | 0.50 | 0.47 | 29.9 | 99.2 | 15,398 | 40,662 | 103,288 | 0.84 |
| IE5 | 2 | 0.02 | 0.43 | 0.55 | 30.0 | 99.5 | 9,256 | 43,731 | 105,019 | 0.86 |
| IE6 | 2 | 0.03 | 0.38 | 0.60 | 30.0 | 99.7 | 9,526 | 44,172 | 108,161 | 0.88 |

iCCD results show that comonomeric content (1-hexenic content) (Wt2) of the poly(ethylene-co-1-hexene) copolymer decreases and high-density fraction (HDF) content (Wt3) increases as the EEDC/Ti molar ratio increases. The changes in molecular weight (MW) of these two components Wt2 and Wt3 also show opposite trends with the MW of the poly(ethylene-co-1-hexene) copolymer increasing while the MW of HDF decreasing. The Mw3/Mw3(0) ratio is lower than 0.90 from the influence of EEDC-1 and EEDC-2 (IE1 to IE3 and IE4 to IE6 versus CE1 in Table 1C).

TABLE 2A

Effects of EEDC-1 and EEDC-2 on PCAT-1: Polymerization Results (Different Addition Mode M-2) (1-hexene 210 mL, H2 3.8 L, activator TEA, Al/Ti 150 mol/mol) for product poly(ethylene-co-1-hexene) copolymer.

| Ex. | EEDC | EEDC/Ti (Mol/Mol) | Cat. Prod. (g PE/g-hr) | Δ(Cat. Prod.) (%) | $I_2$ (g/10 min) | $I_{21}/I_2$ | $\Delta(I_{21}/I_2)$ |
|---|---|---|---|---|---|---|---|
| CE2 | None | 0 | 19,024 | 0 | 4.0 | 28.0 | 0 |
| CE3 | 1 | 2 | 16,789 | −12 | 2.1 | 27.4 | −0.5 |
| IE7 | 1 | 10 | 5,913 | −69 | 0.5 | 25.4 | −2.5 |
| CE4 | 2 | 2 | 17,232 | −9 | 2.8 | 27.2 | −0.7 |
| IE8 | 2 | 5 | 8,370 | −56 | 0.6 | 25.2 | −2.8 |
| IE9 | 2 | 10 | 5,574 | −71 | 0.4 | 25.6 | −2.4 |

TABLE 2B

Effects of EEDC-1 and EEDC-2 on PCAT-1: GPC Results for poly(ethylene-co-1-hexene) copolymer.

| | Compositional GPC Results | | | | | | | | |
|---|---|---|---|---|---|---|---|---|---|
| Ex. | $M_w$ | $M_z$ | $M_w$/ $M_n$ | $M_z$/ $M_w$ | $M_w$ (LS) | $M_z$ (LS) | $M_z$/ $M_w$ (LS) | Δ($M_z$/ $M_w$) (LS) (%) | SCB/ 1000 TC |
| CE2 | 88,075 | 431,923 | 4.29 | 4.90 | 114,629 | 1,964,195 | 17.1 | 0 | 10.8 |
| CE3 | 99,254 | 354,125 | 4.09 | 3.57 | 116,307 | 1,033,078 | 8.88 | −48 | 10.1 |
| IE7 | 143,507 | 476,613 | 3.78 | 3.32 | 147,290 | 704,198 | 4.78 | −72 | 3.8 |
| CE4 | 96,601 | 424,593 | 4.31 | 4.40 | 118,289 | 1,548,620 | 13.1 | −24 | 11.0 |
| IE8 | 136,671 | 422,344 | 3.94 | 3.09 | 141,679 | 581,868 | 4.11 | −76 | 4.5 |
| IE9 | 156,686 | 501,893 | 3.84 | 3.20 | 157,644 | 502,978 | 3.19 | −81 | 5.8 |

TABLE 2C

Effects of EEDC-1 and EEDC-2 on PCAT-1: iCCD Results for poly(ethylene-co-1-hexene) copolymer.

| | iCCD Results | | | | | | | | |
|---|---|---|---|---|---|---|---|---|---|
| Ex. | Wt 1 | Wt 2 | Wt 3 | Tp1 (° C.) | Tp3 (° C.) | Mw1 | Mw2 | Mw3 | Mw3/ Mw3(0) |
| CE2 | 0.03 | 0.57 | 0.40 | 29.7 | 99.4 | 27,176 | 60,127 | 166,116 | 1 |
| CE3 | 0.03 | 0.50 | 0.47 | 29.7 | 99.5 | 29,274 | 64,993 | 146,673 | 0.88 |
| IE7 | 0.01 | 0.31 | 0.68 | 29.8 | 99.9 | 13,536 | 77,298 | 144,202 | 0.87 |
| CE4 | 0.03 | 0.53 | 0.44 | 29.7 | 99.4 | 28,128 | 60,219 | 160,821 | 0.97 |
| IE8 | 0.02 | 0.36 | 0.62 | 29.8 | 99.8 | 20,315 | 75,842 | 145,974 | 0.88 |
| IE9 | 0.01 | 0.30 | 0.69 | 29.7 | 99.9 | 36,247 | 77,761 | 151,413 | 0.91 |

In Tables 1A to 1C, poly(ethylene-co-1-hexene) copolymers are made by mixing procatalyst, TEA, and the (B) (multi-alkoxy)silane as EEDC (if used) together before polymerization (catalyst component addition mode M-1). The catalyst productivities are lower compared to polymerization where TEA and the (B) (multi-alkoxy)silane are premixed and added into reactor followed by the addition of the procatalyst (catalyst component addition mode M-2). The minimization of contacting between procatalyst and TEA results in higher catalyst productivity (catalyst productivity results in Table 2A vs. those in Table 1A). Although the reduction in $I_{21}/I_2$ is not high at a low EEDC/Ti molar ratio (CE3 and CE4 in Table 2A), a large decrease in $I_{21}/I_2$ can be achieved by increasing the usage of EEDC-1 (IE7) or EEDC-2 (IE8 and IE9). The polymers made by M-2 addition mode show the same trends in $M_z$(LS)/$M_w$(LS) and Mw3/Mw3(0) as those obtained by M-1.

TABLE 3A

Effects of EEDC-3 on PCAT-1: Batch Polymerization Results (addition mode M-1, activator TEA, Al/Ti 150 mol/mol, 1-hexene 210 mL, $H_2$ 3.8 L) for poly(ethylene-co-1-hexene) copolymer product.

| Ex. | EEDC | EEDC/Ti (Mol/ Mol) | Cat. Prod. (g PE/g-hr) | Δ(Cat. Prod.) (%) | $I_2$ (g/10 min) | $I_{21}$/ I2 | Δ($I_{21}$/ $I_2$) |
|---|---|---|---|---|---|---|---|
| CE5 | None | 0 | 11,124 | 0 | 2.7 | 26.6 | 0 |
| IE10 | 3 | 2 | 9,273 | −17 | 0.7 | 21.8 | −4.8 |
| IE11 | 3 | 5 | 4,739 | −57 | 0.6 | 22.0 | −4.5 |
| IE12 | 3 | 10 | 3,317 | −70 | 0.4 | 21.4 | −5.1 |

When dicyclopentyldimethoxysilane (EEDC-3) is used as EEDC in M-1 addition mode, there is a large decrease in $I_{21}/I_2$, more than 4 units (IE10 to IE12 versus CE5 in Table 3A).

TABLE 3B

Effects of EEDC-3 on PCAT-1: GPC Results for poly(ethylene-co-1-hexene) copolymer.

| | Compositional GPC Results | | | | | | | | |
|---|---|---|---|---|---|---|---|---|---|
| Ex. | $M_w$ | $M_z$ | $M_w$/ $M_n$ | $M_z$/ $M_w$ | $M_w$ (LS) | $M_z$ (LS) | $M_z$/ $M_w$ | Δ($M_z$/ $M_w$ (%) | SCB/ 1000 TC |
| CE5 | 98,212 | 428,356 | 4.47 | 4.36 | 120,919 | 1,745,983 | 14.44 | 0 | 8.6 |
| IE10 | 141,932 | 599,506 | 4.19 | 4.22 | 143,315 | 576,775 | 4.02 | −72 | 4.8 |
| IE11 | 140,995 | 524,278 | 3.93 | 3.72 | 141,637 | 528,873 | 3.73 | −74 | 4.7 |
| IE12 | 167,253 | 629,574 | 3.84 | 3.76 | 167,110 | 614,038 | 3.67 | −75 | 3.4 |

TABLE 3C

Effects of EEDC-3 on PCAT-1: iCCD Results for poly(ethylene-co-1-hexene) copolymer.

| | iCCD Results | | | | | | | | |
|---|---|---|---|---|---|---|---|---|---|
| Ex. | Wt 1 | Wt 2 | Wt 3 | Tp1 (° C.) | Tp3 (° C.) | Mw1 | Mw2 | Mw3 | Mw3/Mw3(0) |
| CE5 | 0.04 | 0.53 | 0.43 | 29.7 | 99.4 | 21,825 | 68,778 | 162,738 | 1 |
| IE10 | 0.01 | 0.28 | 0.70 | 29.8 | 100 | 17,266 | 69,058 | 141,250 | 0.87 |
| IE11 | 0.02 | 0.26 | 0.72 | 29.7 | 100 | 9,800 | 72,990 | 143,136 | 0.88 |
| IE12 | 0.02 | 0.20 | 0.78 | 29.8 | 100 | 23,764 | 84,678 | 151,082 | 0.93 |

Reductions in Mz(LS)/Mw(LS) and Mw3/Mw3(0) are also observed (Tables 3B and 30), similar to EEDC-1 and EEDC-2.

TABLE 4A

Effects of EEDC-3 and EEDC-4 on PCAT-1: Batch Reactor Polymerization Results (Addition Mode M-2, activator TEA, Al/Ti 150 mol/mol, 1-hexene 210 mL, H2 3.8 L) for making poly(ethylene-co-1-hexene) copolymer.

| Ex. | EEDC | EEDC/Ti (Mol/Mol) | Catalyst Productivity (g PE/g-hr) | Δ(Cat. Prod.) (%) | $I_2$ (g/10 min) | $\Delta I_{21}/I_2$ | $\Delta(I_{21}/I_2)$ |
|---|---|---|---|---|---|---|---|
| CE2 | None | 0 | 19,024 | 0 | 4.0 | 28.0 | 0 |
| CE6 | 3 | 2 | 18,360 | −3 | 3.7 | 28.5 | 0.5 |

TABLE 4A-continued

Effects of EEDC-3 and EEDC-4 on PCAT-1: Batch Reactor Polymerization Results (Addition Mode M-2, activator TEA, Al/Ti 150 mol/mol, 1-hexene 210 mL, H2 3.8 L) for making poly(ethylene-co-1-hexene) copolymer.

| Ex. | EEDC | EEDC/Ti (Mol/Mol) | Catalyst Productivity (g PE/g-hr) | Δ(Cat. Prod.) (%) | $I_2$ (g/10 min) | $\Delta I_{21}/I_2$ | $\Delta(I_{21}/I_2)$ |
|---|---|---|---|---|---|---|---|
| IE13 | 3 | 5 | 10,161 | −47 | 0.6 | 23.4 | −4.6 |
| IE14 | 3 | 10 | 10,121 | −47 | 0.4 | 24.4 | −3.6 |
| IE15 | 4 | 2 | 14,793 | −22 | 1.2 | 24.2 | −3.8 |
| IE16 | 4 | 5 | 10,374 | −45 | 0.6 | 24.9 | −3.1 |
| IE17 | 4 | 10 | 7,793 | −59 | 0.5 | 22.5 | −5.4 |

TABLE 4B

Effects of EEDC-3 and EEDC-4 on PCAT-1: GPC Results for making poly(ethylene-co-1-hexene) copolymer.

| | Compositional GPC Results | | | | | | | | |
|---|---|---|---|---|---|---|---|---|---|
| Ex. | $M_w$ | $M_z$ | $M_w/M_n$ | $M_z/M_w$ | $M_w$ (LS) | $M_z$ (LS) | $M_z/M_w$ (LS) | $\Delta(M_z/M_w)$ (LS) (%) | SCB/1000 TC |
| CE2 | 88,075 | 431,923 | 4.29 | 4.90 | 114,629 | 1,964,195 | 17.14 | 0 | 10.8 |
| CE6 | 90,108 | 393,995 | 4.31 | 4.37 | 115,057 | 2,292,931 | 19.93 | 16 | 7.4 |
| IE13 | 136,804 | 455,063 | 3.63 | 3.33 | 139,071 | 524,579 | 3.77 | −78 | 4.5 |
| IE14 | 147,117 | 642,232 | 3.68 | 4.37 | 161,153 | 642,349 | 3.99 | −77 | 2.6 |
| IE15 | 111,894 | 362,929 | 3.86 | 3.24 | 121,030 | 391,440 | 3.23 | −81 | 5.4 |
| IE16 | 128,283 | 374,854 | 3.71 | 2.92 | 138,209 | 414,177 | 3.00 | −83 | 3.8 |
| IE17 | 138,299 | 415,210 | 3.58 | 3.00 | 149,383 | 447,401 | 2.99 | −83 | 3.7 |

TABLE 4C

Effects of EEDC-3 and EEDC-4 on PCAT-1: iCCD Results for making poly(ethylene-co-1-hexene) copolymer.

| | iCCD Results | | | | | | | | |
|---|---|---|---|---|---|---|---|---|---|
| Ex. | Wt1 | Wt2 | Wt3 | Tp1 (° C.) | Tp3 (° C.) | Mw1 | Mw2 | Mw3 | Mw3/Mw3(0) |
| CE2 | 0.03 | 0.57 | 0.40 | 29.7 | 99.4 | 27,176 | 60,127 | 166,116 | 1 |
| CE6 | 0.04 | 0.55 | 0.41 | 29.7 | 99.4 | 21,195 | 56,332 | 164,133 | 0.99 |
| IE13 | 0.01 | 0.26 | 0.73 | 29.8 | 100 | 27,603 | 66,414 | 134,739 | 0.81 |
| IE14 | 0.02 | 0.24 | 0.74 | 29.8 | 99.7 | 29,396 | 40,715 | 99,213 | 0.60 |
| IE15 | 0.02 | 0.37 | 0.61 | 29.8 | 100 | 23,580 | 67,737 | 133,200 | 0.80 |
| IE16 | 0.03 | 0.37 | 0.60 | 29.8 | 98.9 | 34,655 | 37,527 | 87,171 | 0.52 |
| IE17 | 0.03 | 0.32 | 0.65 | 29.8 | 99.1 | 26,564 | 41,700 | 92,804 | 0.56 |

When EEDC-3 is pre-mixed with cocatalyst TEA before contacting procatalyst PCAT-1 (catalyst component addition mode M-2), high catalyst productivity is maintained at high EEDC/Ti molar ratio, which is beneficial for achieving high polymer MW when using addition mode M-2. Although the decreases in $I_{21}/I_2$ are not as much as those from catalyst addition mode M-1 (CE6 and IE13 to IE14 in Tables 4A to 40 versus IE10 to IE12 in Tables 3A to 3C), a lower value of Mw/Mn is achieved at comparable $I_2$ and SCB/1000 TC from the addition mode M-2 (IE13 versus IE11). Furthermore, EEDC-4 performed better in achieving lower values of $I_{21}/I_2$, $M_w/M_n$, $M_z$(LS)/$M_w$(LS), and Mw3/Mw3(0) than EEDC-3 in addition mode M-2.

TABLE 5A

Effects of Catalyst Component Addition Mode: Batch Reactor Polymerization Results (EEDC-3, PCAT-1, addition mode M-2 or M-3 (IE18 & IE19), activator TEA, Al/Ti 150 mol/mol, 1-hexene 210 mL, $H_2$ 7 L) for making poly(ethylene-co-1-hexene) copolymer.

| Ex. | EEDC | EEDC/Ti (Mol/Mol) | Catalyst Productivity (g PE/g-hr) | Δ(Cat. Prod.) (%) | $I_2$ (g/10 min) | $I_{21}/I_2$ | $\Delta(I_{21}/I_2)$ |
|---|---|---|---|---|---|---|---|
| CE7 | 0 | 0 | 22,141 | 0 | 26.0 | 26.4 | 0 |
| IE18 | 3 | 2 | 13,348 | −40 | 5.4 | 22.5 | −3.9 |
| IE19 | 3 | 5 | 8,119 | −63 | 4.3 | 22.2 | −4.2 |
| IE20 | 3 | 2 | 17,714 | −20 | 5.2 | 23.0 | −3.4 |
| IE21 | 3 | 5 | 9,464 | −57 | 3.8 | 22.5 | −3.9 |

When CE2, CE6, and IE13 are repeated using 7 L of $H_2$, instead of 3.8 L of $H_2$ as in Table 4A, the catalyst system productivities remain about the same (CE7, IE20 and IE21 in Table 5A). When the procatalyst PCAT-1 is mixed with external donor EEDC-3 before contacting with TEA (IE18 and IE19 using catalyst component addition mode M-3 in Table 5A), catalyst system productivities decreased relative to those obtained from addition mode M-2 mode (IE20 and IE21 in Table 5A), but were still expectedly higher than what would be obtained from addition mode M-1, which should be similar to IE10 and IE11 in Table 3A. Additional benefits from using catalyst component addition mode M-3 include higher reduction in $I_{21}/I_2$, $M_w/M_n$, and $M_z$(LS)/$M_w$ (LS) (Table 5B) while maintaining higher copolymer content (Mt2) and copolymer molecular weight (Mw2) (Table 5C).

TABLE 5B

Effects of Catalyst Component Addition Mode (EEDC-3): GPC Results for poly(ethylene-co-1-hexene) copolymer.

| | Compositional GPC Results | | | | | | | | |
|---|---|---|---|---|---|---|---|---|---|
| Ex. | $M_w$ | $M_z$ | $M_w/M_n$ | $M_z/M_w$ | $M_w$ (LS) | $M_z$ (LS) | $M_z/M_w$ (LS) | $\Delta(M_z/M_w)$ (LS) (%) | SCB/1000 TC |
| CE7 | 53,230 | 221,929 | 3.96 | 4.17 | 70,842 | 1,715,292 | 24.2 | 0 | 9.0 |
| IE18 | 77,164 | 221,202 | 3.53 | 2.87 | 76,232 | 293,605 | 3.85 | −84 | 3.7 |
| IE19 | 81,170 | 231,109 | 3.39 | 2.85 | 81,051 | 227,804 | 2.81 | −88 | 3.2 |
| IE20 | 75,840 | 275,971 | 3.66 | 3.64 | 78,037 | 772,321 | 9.90 | −59 | 3.5 |
| IE21 | 84,365 | 394,546 | 3.76 | 4.68 | 84,362 | 500,876 | 5.94 | −75 | 3.1 |

TABLE 5C

Effects of Catalyst Component Addition Mode (EEDC-3): iCCD Results for poly(ethylene-co-1-hexene) copolymer.

| | iCCD Results | | | | | | | | |
|---|---|---|---|---|---|---|---|---|---|
| Ex. | Wt1 | Wt2 | Wt3 | Tp1 (° C.) | Tp3 (° C.) | Mw1 | Mw2 | Mw3 | Mw3/ Mw3(0) |
| CE7 | 0.05 | 0.64 | 0.31 | 29.8 | 99.0 | 15,890 | 38,580 | 129,899 | 1 |
| IE18 | 0.01 | 0.39 | 0.60 | 30.0 | 99.7 | 24,536 | 41,362 | 95,915 | 0.74 |
| IE19 | 0.01 | 0.33 | 0.66 | 29.8 | 99.9 | 30,586 | 38,761 | 95,823 | 0.74 |
| IE20 | 0.01 | 0.36 | 0.63 | 30.0 | 99.9 | 30,493 | 37,222 | 86,255 | 0.66 |
| IE21 | 0.01 | 0.33 | 0.66 | 30.0 | 100 | 24,995 | 35,130 | 90,721 | 0.70 |

TABLE 6A

Effects of EEDC-3, PCAT-2 with addition mode M-3, activator TMA, Al/Ti 100 mol/mol, 1-hexene 20 mL, $H_2$ 3.8 L: Batch Reactor Polymerization Results for poly(ethylene-co-1-hexene) copolymer.

| Ex. | EEDC-3/Ti (Mol/Mol) | Cat. Prod. (g PE/g-hr) | Δ(Cat. Prod.) (%) | $I_2$ (g/10 min) | $I_{21}/I_2$ | $\Delta(I_{21}/I_2)$ |
|---|---|---|---|---|---|---|
| CE8 | 0 | 20,612 | 0 | 1.2 | 27.0 | 0 |
| IE22 | 2 | 15,613 | −24 | 0.5 | 23.1 | −3.8 |
| IE23 | 5 | 12,518 | −39 | 0.3 | 20.8 | −6.1 |
| IE24 | 10 | 9,354 | −55 | 0.2 | 21.2 | −5.8 |

TABLE 6B

Effects of EEDC-3. PCAT-2 with TMA as Cocatalyst: GPC Results for poly(ethylene-co-1-hexene) copolymer.

| | Compositional GPC Results | | | | | | | | |
|---|---|---|---|---|---|---|---|---|---|
| Ex. | $M_w$ | $M_z$ | $M_w/M_n$ | $M_z/M_w$ | $M_w$ (LS) | $M_z$ (LS) | $M_z/M_w$ (LS) | $\Delta(M_z/M_w)$ (LS) (%) | SCB/1000 TC |
| CE8 | 123,581 | 578,433 | 4.29 | 4.68 | 162,563 | 2,870,803 | 17.66 | 0 | 2.2 |
| IE22 | 142,992 | 457,839 | 3.46 | 3.20 | 150,024 | 627,613 | 4.18 | −76 | 1.2 |
| IE23 | 166,567 | 546,714 | 3.35 | 3.28 | 174,512 | 566,033 | 3.24 | −82 | 0.9 |
| IE24 | 192,785 | 700,636 | 3.44 | 3.63 | 194,808 | 710,962 | 3.65 | −79 | 0.9 |

PCAT-2 is made by modifying PCAT-1 with tri-n-hexylaluminum and diethylaluminum chloride. When PCAT-2 is used in polymerization with trimethylaluminum as cocatalyst and EEDC-3 as EEDC, catalyst system productivity remains high (Table 6A). Lower $I_{21}/I_2$ of about 21 were achieved at EEDC/Ti molar ratio from 5 and 10 (IE23 and IE24). Greater decrease in $M_z$(LS)/$M_w$(LS) and lower Mw3/Mw3(0) were also realized (IE22 to IE24 versus CE8 in Tables 6A and 6B).

TABLE 7A

Effects of EEDC-2, PCAT-3, addition mode M-1, activator TEA, Al/Ti 360 mol/mol, 1-hexene 210 mL, $H_2$ 7 L): Polymerization Results for poly(ethylene-co-1-hexene) copolymer.

| Ex. | EEDC-2/Ti (Mol/Mol) | Cat. Prod. (g PE/g-hr) | Δ(Cat. Prod.) (%) | $I_2$ (g/10 min) | $I_{21}/I_2$ | $\Delta(I_{21}/I_2)$ |
|---|---|---|---|---|---|---|
| CE9 | 0 | 5,884 | 0 | 10.1 | 25.6 | 0 |
| IE25 | 2 | 4,398 | −25 | 5.1 | 22.2 | −3.5 |

TABLE 7A-continued

Effects of EEDC-2, PCAT-3, addition mode M-1, activator TEA, Al/Ti 360 mol/mol, 1-hexene 210 mL, $H_2$ 7 L): Polymerization Results for poly(ethylene-co-1-hexene) copolymer.

| Ex. | EEDC-2/Ti (Mol/Mol) | Cat. Prod. (g PE/g-hr) | Δ(Cat. Prod.) (%) | $I_2$ (g/10 min) | $I_{21}/I_2$ | $\Delta(I_{21}/I_2)$ |
|---|---|---|---|---|---|---|
| IE26 | 5 | 2,965 | −50 | 3.6 | 22.3 | −3.4 |
| IE27 | 10 | 1,688 | −71 | 2.4 | 22.6 | −3.0 |

Significant decreases in $I_{21}/I_2$, $M_z$(LS)/$M_w$(LS) and Mw3/Mw3(0) are also obtained for another procatalyst, PCAT-3, that is derived from a THF-solubilized $MgCl_2$ and titanium alkoxide (IE25 to IE27 versus CE9 in Tables 7A to 7C). Similar to IE4 to IE6 in Tables 1A to 1C, relatively low catalyst productivity is again observed for this set of experiment using catalyst component addition mode M-1.

TABLE 7B

Effects of EEDC-2 PCAT-3: GPC Results for poly(ethylene-co-1-hexene) copolymer.

| | Compositional GPC Results | | | | | | | | |
|---|---|---|---|---|---|---|---|---|---|
| Ex. | $M_w$ | $M_z$ | $M_w/M_n$ | $M_z/M_w$ | $M_w$ (LS) | $M_z$ (LS) | $M_z/M_w$ (LS) | $\Delta(M_z/M_w)$ (LS) (%) | SCB/1000 TC |
| CE9 | 65,475 | 244,664 | 3.78 | 3.74 | 76,413 | 887,254 | 11.61 | 0 | 10.6 |
| IE25 | 77,970 | 252,011 | 3.60 | 3.23 | 83,524 | 476,686 | 5.71 | −51 | 6.7 |
| IE26 | 91,343 | 433,345 | 3.85 | 4.74 | 94,349 | 561,763 | 5.95 | −49 | 5.0 |
| IE27 | 96,086 | 292,665 | 3.61 | 3.05 | 100,537 | 373,544 | 3.72 | −68 | 3.6 |

TABLE 7C

Effects of EEDC-2 PCAT-3: iCCD Results for poly(ethylene-co-1-hexene) copolymer.

| Ex. | iCCD Results | | | | | | | | | |
|---|---|---|---|---|---|---|---|---|---|---|
| | Wt1 | Wt2 | Wt3 | Tp1 (° C.) | Tp2 (° C.) | Tp3 (° C.) | Mw1 | Mw2 | Mw3 | Mw3/Mw3(0) |
| CE9 | 0.04 | 0.63 | 0.34 | 29.6 | | 98.9 | 23,394 | 50,274 | 122,950 | 1 |
| IE25 | 0.04 | 0.50 | 0.46 | 29.9 | | 99.3 | 20,109 | 50,448 | 106,465 | 0.87 |
| IE26 | 0.02 | 0.45 | 0.53 | 29.9 | | 99.4 | 31,990 | 53,450 | 103,936 | 0.85 |
| IE27 | 0.02 | 0.36 | 0.62 | 29.8 | | 99.7 | 15,646 | 57,218 | 109,965 | 0.89 |

TABLE 8A

Effects of EEDC-3, PCAT-3 (addition mode M-3, activator TEA, Al/Ti 360 mol/mol, 1-hexene 210 mL, $H_2$ 7 L): Batch Reactor Polymerization Results for poly(ethylene-co-1-hexene) copolymer.

| Ex. | EEDC | EEDC/Ti (Mol/Mol) | Cat. Prod. (g PE/g-hr) | Δ(Cat. Prod.) (%) | $I_2$ (g/10 min) | $I_{21}/I_2$ | $\Delta(I_{21}/I_2)$ |
|---|---|---|---|---|---|---|---|
| CE10 | None | 0 | 18,688 | 0 | 13.8 | 26.3 | 0 |
| CE11 | 3 | 0.5 | 19,072 | 2 | 13.9 | 26.1 | −0.1 |
| CE12 | 3 | 1.5 | 20,733 | 11 | 10.4 | 24.9 | −1.4 |
| CE13 | 3 | 2 | 19,910 | 7 | 11.0 | 25.0 | −1.3 |
| IE28 | 3 | 5 | 20,610 | 10 | 10.7 | 23.1 | −3.1 |
| IE29 | 3 | 10 | 20,435 | 9 | 8.3 | 21.6 | −4.6 |
| IE30 | 3 | 25 | 13,580 | −27 | 6.4 | 20.6 | −5.7 |

When the procatalyst PCAT-3 is treated with EEDC-3 before contacting cocatalyst TEA (catalyst component addition mode M-3), the inventive catalyst systems are able to significantly decrease $I_{21}/I_2$, $M_z(LS)/M_w(LS)$ and Mw3/Mw3(0) while maintaining high catalyst productivities at high EEDC/Ti molar ratios (IE28 to IE30 versus CE10 in Tables 8A to 8C). The impact of the external donor EEDC-3 on reducing catalyst productivity for PCAT-3 is lower than the impact on PCAT-1 (Table 6A). Actually, there is a small increase in catalyst productivity when the EEDC/Ti molar ratio is not higher than 10 (CE10 to CE13 and IE28 to IE30 in Table 8A). However, the decrease in $I_{21}/I_2$, $M_z(LS)/M_w(LS)$ and Mw3/Mw3(0) is relatively low when EEDC/Ti molar ratio≤2 (CE10 to CE13).

TABLE 8B

Effects of EEDC-3 PCAT-3: GPC Results for poly(ethylene-co-1-hexene) copolymer.

| Ex. | Compositional GPC Results | | | | | | | | |
|---|---|---|---|---|---|---|---|---|---|
| | $M_w$ | $M_z$ | $M_w/M_n$ | $M_z/M_w$ | $M_w$ (LS) | $M_z$ (LS) | $M_z/M_w$ (LS) | $\Delta(M_z/M_w)$ (%) (LS) | SCB/1000 TC |
| CE10 | 64,799 | 249,801 | 4.06 | 3.85 | 77,057 | 1,674,015 | 21.72 | 0 | 8.7 |
| CE11 | 64,154 | 240,184 | 3.97 | 3.74 | 76,108 | 1,526,874 | 20.06 | −8 | 8.8 |
| CE12 | 69,344 | 235,291 | 3.94 | 3.39 | 75,331 | 880,731 | 11.69 | −46 | 7.3 |
| CE13 | 66,490 | 229,309 | 3.82 | 3.45 | 73,570 | 1,036,369 | 14.09 | −35 | 7.3 |
| IE28 | 64,624 | 194,428 | 3.54 | 3.01 | 66,322 | 580,658 | 8.76 | −60 | 6.2 |
| IE29 | 69,789 | 183,342 | 3.46 | 2.63 | 67,715 | 249,065 | 3.68 | −83 | 4.0 |
| IE30 | 73,342 | 182,649 | 3.22 | 2.49 | 70,677 | 267,149 | 3.78 | −83 | 3.2 |

TABLE 8C

Effects of EEDC-3 PCAT-3: iCCD Results for poly(ethylene-co-1-hexene) copolymer.

| Ex. | iCCD Results | | | | | | | | |
|---|---|---|---|---|---|---|---|---|---|
| | Wt1 | Wt2 | Wt3 | Tp1 (° C.) | Tp3 (° C.) | Mw1 | Mw2 | Mw3 | Mw3/Mw3(0) |
| CE10 | 0.03 | 0.61 | 0.36 | 29.9 | 99.0 | 14,965 | 44,047 | 124,236 | 1 |
| CE11 | 0.03 | 0.62 | 0.35 | 29.9 | 98.9 | 23,060 | 49,918 | 124,157 | 1.00 |
| CE12 | 0.02 | 0.57 | 0.41 | 29.9 | 99.1 | 35,952 | 51,432 | 113,245 | 0.91 |
| CE13 | 0.02 | 0.56 | 0.41 | 29.9 | 99.2 | 16,620 | 46,447 | 109,970 | 0.89 |
| IE28 | 0.02 | 0.49 | 0.50 | 29.9 | 99.4 | 33,189 | 43,061 | 90,923 | 0.73 |

TABLE 8C-continued

Effects of EEDC-3 PCAT-3: iCCD Results for poly(ethylene-co-1-hexene) copolymer.

| | iCCD Results | | | | | | | | |
|---|---|---|---|---|---|---|---|---|---|
| Ex. | Wt1 | Wt2 | Wt3 | Tp1 (° C.) | Tp3 (° C.) | Mw1 | Mw2 | Mw3 | Mw3/Mw3(0) |
| IE29 | 0.01 | 0.40 | 0.59 | 29.9 | 99.6 | 37,487 | 42,319 | 85,466 | 0.69 |
| IE30 | 0.01 | 0.35 | 0.64 | 29.9 | 99.7 | 22,514 | 34,474 | 84,269 | 0.68 |

Continuous Fluidized Bed Gas Phase Reactor Results: Effects of (Multi-Alkoxy)Silane External Donors on Polymers with Similar Density and MI ($I_2$).

TABLE 9A

Effects of EEDC-3 PCAT-1: Fluidized bed reactor Polymerization Results for poly(ethylene-co-1-hexene) copolymer or polyethylene homopolymer.

| Ex. | EEDC-3/Ti (Mol/Mol) | TEA/Ti (Mol/Mol) | Cat. Act. (g PE/g) | Δ(Cat. Act.) (%) | Resin Density (g/cc) | $I_2$ (g/10 min) | $I_{21}/I_2$ | $\Delta(I_{21}/I_2)$ | Hex. Extract. (%) |
|---|---|---|---|---|---|---|---|---|---|
| CE-P1 | 0 | 38.8 | 34,830 | 0 | 0.949 | 3.7 | 24.3 | 0 | 0.07 |
| IE-P1 | 3.24 | 51.8 | 24,155 | −31 | 0.949 | 3.6 | 21.4 | −2.8 | 0.11 |
| CE-P2 | 0 | 36.7 | 31,887 | 0 | 0.952 | 9.6 | 24.1 | 0 | 0.17 |
| IE-P2 | 3.48 | 51.8 | 22,841 | −28 | 0.952 | 10.1 | 22.6 | −1.5 | 0.16 |
| CE-P3 | 0 | 52.4 | 41,657 | 0 | 0.959 | 1.3 | 27.4 | 0 | 0.09 |
| IE-P3 | 2.61 | 45.4 | 24,038 | −42 | 0.959 | 1.2 | 23.8 | −3.6 | 0.09 |

Three sets of poly(ethylene-co-1-hexene) copolymers are made. There are two poly(ethylene-co-1-hexene) copolymers in each set with similar $I_2$ and density: one made in the absence of EEDC and the other with the (multi-alkoxy) silane EEDC-3 (CE-P1 versus IE-P1, CE-P2 versus IE-P2, and CE-P2 versus IE-P3 in Tables 9A to 9C). The results confirm the contribution of the (B) (multi-alkoxy)silane as external electron donor compound to the decrease in catalyst activity and decrease in $I_{21}/I_2$ when polymers are made with similar $I_2$ and density (Table 9A). Since the (B) (multi-alkoxy)silane function as EEDCs to decrease $I_2$ and comonomer incorporation (SCB/1000 TC) in the poly(ethylene-co-1-hexene) copolymers (Tables 1A to 8A), a higher $H_2$ content and a higher comonomeric content (1-hexenic content) may be used in the polymerization reactor to achieve similar $I_2$ and density (CE-P1 versus IE-P1, CE-P2 versus IE-P2 in Table C). For making polyethylene homopolymer, only a higher $H_2$ content is necessary for achieving the same $I_2$ (CE-P3 versus IE-P3 in Table C).

There is no consistent trend for the effect of the (B) (multi-alkoxy)silane as EEDC (e.g., EEDC-3) on the content of hexane extractables in the polyolefin polymer products. In the presence of the (B) (multi-alkoxy)silane as EEDC, the content of hexane extractables is higher in polyolefin products having about 3.6 g/10 min. $I_2$ and about 0.9489 g/cc density (CE-P1 versus IE-P1 in Table 9A), slightly lower in polyolefin products having about 10.1 g/10 min. $I_2$ and about 0.9522 g/cc density (CE-P2 versus IE-P2), and about the same at in polyolefin products having about 1.2 g/10 min. $I_2$ and about 0.9591 g/cc density (CE-P3 versus IE-P3).

TABLE 9B

Effects of EEDC-3 PCAT-1: GPC Results for poly(ethylene-co-1-hexene) copolymer or polyethylene homopolymer.

| | | Compositional GPC Results | | | | | | | |
|---|---|---|---|---|---|---|---|---|---|
| Ex. | EEDC-3/Ti (Mol/Mol) | $M_w$ | $M_w/M_n$ | $M_z/M_w$ | $M_w$ (LS) | $M_z$ (LS) | $M_z/M_w$ (LS) | $\Delta(M_z/M_w)$ (LS) (%) | SCB/1000 TC |
| CE-P1 | 0 | 92,081 | 4.56 | 4.20 | 120,466 | 2,738,868 | 22.7 | 0 | 2.3 |
| IE-P1 | 3.24 | 84,840 | 3.91 | 2.94 | 86,178 | 400,623 | 4.7 | −80 | 2.0 |
| CE-P2 | 0 | 70,644 | 4.52 | 4.22 | 89,736 | 2,373,665 | 26.5 | 0 | 2.2 |
| IE-P2 | 3.48 | 65,130 | 3.86 | 2.79 | 67,048 | 278,499 | 4.2 | −84 | 2.2 |
| CE-P3 | 0 | 127,295 | 5.22 | 4.24 | 162,190 | 2,371,206 | 14.6 | 0 | 0 |
| IE-P3 | 2.61 | 122,645 | 4.46 | 3.39 | 125,857 | 663,770 | 5.3 | −64 | 0 |

Substantial reduction is also observed when EEDC-3 is used for making polymer with similar $I_2$ and density (CE-P1 versus IE-P1, CE-P2 versus IE-P2, and CE-P2 versus IE-P3 in Tables 9B). However, the comonomer distribution becomes less homogeneous with the comonomer preferably residing on the low molecular weight polymer chains.

TABLE 9C

Effects of EEDC-3 PCAT-1: iCCD Results for poly(ethylene-co-1-hexene) copolymer.

| | | iCCD Results | | | | | | | | |
|---|---|---|---|---|---|---|---|---|---|---|
| Ex. | EEDC-3/Ti (Mol/Mol) | Wt1 | Wt2 | Wt3 | Tp1 (° C.) | Tp3 (° C.) | Mw1 | Mw2 | Mw3 | Mw3/ Mw3(0) |
| CE-P1 | 0 | 0 | 0.28 | 0.72 | 29.7 | 99.9 | 54,916 | 34,871 | 135,422 | 1 |
| IE-P1 | 3.24 | 0 | 0.26 | 0.74 | 29.6 | 100 | 72,457 | 36,643 | 98,634 | 0.73 |
| CE-P2 | 0 | 0.01 | 0.32 | 0.67 | 29.7 | 99.8 | 38,927 | 25,144 | 115,003 | 1 |
| IE-P2 | 3.48 | 0.01 | 0.28 | 0.71 | 29.6 | 100.1 | 78,569 | 23,914 | 81,002 | 0.70 |
| CE-P3 | 0 | 0 | 0.06 | 0.93 | 29.7 | 101.4 | 121,056 | 98,191 | 149,172 | 1 |
| IE-P3 | 2.61 | 0 | 0.05 | 0.94 | 29.8 | 101.5 | 83,907 | 55,892 | 117,879 | 0.79 |

The external donor EEDC-3 also causes reduction in Mw3 with Mw3/Mw3(0)<0.80 (CE-P1 versus IE-P1, CE-P2 versus IE-P2, and CE-P2 versus IE-P3 in Tables 9C).

The invention claimed is:

1. A procatalyst system suitable for making an olefin polymerization catalyst and consisting essentially of a blend of (A) a pre-made solid procatalyst and (B) a (multi-alkoxy) silane selected from the group consisting of tetraethoxysilane and propyltrimethoxysilane; wherein the (A) pre-made solid procatalyst consists essentially of a titanium compound, magnesium chloride solids, and optionally a silica; wherein the magnesium chloride solids consist essentially of $MgCl_2$ and tetrahydrofuran; and wherein the procatalyst system is free of any other electron donor organic compound.

2. The procatalyst system of claim 1 wherein the titanium compound is at least one compound of formula (III): $TiX_4$ (III), wherein each X independently is Cl, Br, I, or a ($C_1$-$C_{12}$) alkoxy.

3. The procatalyst system of claim 1 further consisting essentially of a ligand-metal complex of formula (IV): MX4 (IV), wherein M is Hf or Zr and each X independently is Cl, Br, I, or a ($C_1$-$C_6$) alkoxy.

4. A method of synthesizing a procatalyst system, the method comprising drying a mixture consisting essentially of a solution and, optionally, a silica, and being free of (B) a (multi-alkoxy) silane and any other electron donor organic compound, wherein the solution consists essentially of a titanium compound, magnesium chloride, and the at least one oxaheterocycle mixed in a hydrocarbon solvent; thereby removing the hydrocarbon solvent from the mixture and crystallizing the magnesium chloride so as to give (A) a pre-made solid procatalyst; and contacting the (A) pre-made solid procatalyst with the (B) (multi-alkoxy)silane; thereby making the blend of the procatalyst system of claim 1.

5. A method of making a catalyst system suitable for polymerizing an olefin, the method comprising contacting the procatalyst system of claim 1, with an activating effective amount of (C) an activator, thereby making the catalyst system; wherein the catalyst system is free of any other electron donor organic compound and is suitable for polymerizing an olefin.

6. A method of making a catalyst system suitable for polymerizing an olefin, the method comprising simultaneously or sequentially contacting an activating effective amount of (C) an activator, (B) a (multi-alkoxy)silane selected from the group consisting of tetraethoxysilane and propyltrimethoxysilane, and (A) a pre-made solid procatalyst, thereby making the catalyst system; wherein the (A) pre-made solid procatalyst consists essentially of a titanium compound, magnesium chloride solids, and optionally a silica; wherein the magnesium chloride solids consist essentially of $MgCl_2$ and tetrahydrofuran; and wherein the catalyst system is free of the any other electron donor organic compound and is suitable for polymerizing an olefin.

7. A catalyst system made by the method of claim 5.

8. A method of synthesizing a polyolefin polymer, the method comprising contacting at least one olefin monomer with the catalyst system of claim 7 under effective polymerization conditions in a polymerization reactor, thereby making the polyolefin polymer.

* * * * *